(12) United States Patent
Taherzadeh Boroujeni et al.

(10) Patent No.: US 11,943,070 B2
(45) Date of Patent: Mar. 26, 2024

(54) NETWORK FEEDBACK FOR UPLINK CONTINUITY

(71) Applicant: QUALCOMM Incorporated, San Diego, CA (US)

(72) Inventors: Mahmoud Taherzadeh Boroujeni, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 110 days.

(21) Appl. No.: 17/401,255

(22) Filed: Aug. 12, 2021

(65) Prior Publication Data

US 2023/0046405 A1 Feb. 16, 2023

(51) Int. Cl.
*H04L 1/1867* (2023.01)
*H04L 5/00* (2006.01)
*H04W 56/00* (2009.01)

(52) U.S. Cl.
CPC .......... *H04L 1/1896* (2013.01); *H04L 5/0082* (2013.01); *H04W 56/0035* (2013.01); *H04W 56/005* (2013.01)

(58) Field of Classification Search
None
See application file for complete search history.

(56) References Cited

U.S. PATENT DOCUMENTS

2022/0046566 A1\* 2/2022 Leng ................. H04W 56/0045
2022/0224467 A1\* 7/2022 Vos ....................... H04L 5/0053

\* cited by examiner

*Primary Examiner* — Saad Khawar
(74) *Attorney, Agent, or Firm* — Holland & Hart LLP

(57) ABSTRACT

Methods, systems, and devices for wireless communications are described. Specifically, techniques that enable a base station to send a feedback message to a user equipment (UE) indicating a quality of uplink continuity are described. The base station may observe uplink communications received from the UE to determine a level of uplink continuity associated with the UE. Based on the measurements, the base station may transmit a feedback message indicating one or more measurements corresponding to the performance of the UE in maintaining uplink continuity. By utilizing techniques for indicating the quality of uplink continuity to the UE, the UE may address uplink continuity mismatches, which may increase overall network efficiency and improve channel estimations.

40 Claims, 16 Drawing Sheets

NETWORK FEEDBACK FOR UPLINK CONTINUITY

FIELD OF TECHNOLOGY

The following relates to wireless communications, including network feedback for uplink continuity.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

A UE and a base station may leverage uplink continuity as part of joint channel estimation based on a number of uplink messages sent from the UE to the base station. The joint channel estimation may be beneficial if the UE is capable of maintaining a level of uplink continuity for the duration of the uplink messages. In some cases, however, the UE may be unable to meet an expected uplink continuity, which may result in the degradation of uplink continuity and as such, inaccurate channel estimation, increased latency, and an overall decrease in network efficiency.

SUMMARY

The described techniques relate to improved methods, systems, devices, and apparatuses that support network feedback for uplink continuity. Generally, the described techniques provide for a base station to send a feedback message to a user equipment (UE) indicating a quality of uplink continuity. The base station may perform one or more measurements, analyses, or both, to determine a level of uplink continuity maintained at the UE. The feedback message may indicate a measure corresponding to the performance of the UE in maintaining uplink continuity. For example, the feedback message may indicate an uplink continuity classification, where the uplink continuity classification may indicate how well the UE is maintaining uplink continuity (e.g., a quality of uplink continuity observed at the base station). In some examples, the feedback message may include other parameters or quantities related to the uplink continuity, such as observed phase drift, observed amplitude variation, and observed timing advance variation. Additionally, or alternatively, the feedback message may include an indication of a presence of phase continuity, a presence of amplitude continuity, a maximum length of observed uplink continuity, or any combination thereof.

By utilizing techniques for indicating a quality of uplink continuity to the UE, the UE may obtain information (real-time or near real-time feedback) to be able to respond to degradations in uplink continuity (e.g., phase drift). That is, the UE may be informed (e.g., by the feedback message from the base station) when uplink continuity is not being maintained at an acceptable level. The described techniques provide for providing a UE with information related to the quality of uplink continuity and the ability of the UE to maintain uplink continuity. By keeping the UE informed of uplink continuity, the UE may be able to adjust future capabilities of the UE or indications of capability by the UE in the future. Further, overall network efficiency may increase through more accurate joint channel estimation (e.g., which may aide in demodulation reference signal (DMRS) bundling) and reduced mismatch between indicated uplink continuity and observed uplink continuity.

A method for wireless communications at a UE is described. The method may include transmitting a set of multiple uplink messages to a base station over a set of transmission time intervals (TTIs), receiving, from the base station, a feedback message indicating a quality of uplink continuity of the UE based on the set of multiple uplink messages, where the uplink continuity corresponds to a variation of one or more uplink parameters associated with the set of multiple uplink messages over the set of TTIs, and communicating with the base station based on the feedback message.

An apparatus for wireless communications at a UE is described. The apparatus may include a processor, memory coupled with the processor, and instructions stored in the memory. The instructions may be executable by the processor to cause the apparatus to transmit a set of multiple uplink messages to a base station over a set of TTIs, receive, from the base station, a feedback message indicating a quality of uplink continuity of the UE based on the set of multiple uplink messages, where the uplink continuity corresponds to a variation of one or more uplink parameters associated with the set of multiple uplink messages over the set of TTIs, and communicate with the base station based on the feedback message.

Another apparatus for wireless communications at a UE is described. The apparatus may include means for transmitting a set of multiple uplink messages to a base station over a set of TTIs, means for receiving, from the base station, a feedback message indicating a quality of uplink continuity of the UE based on the set of multiple uplink messages, where the uplink continuity corresponds to a variation of one or more uplink parameters associated with the set of multiple uplink messages over the set of TTIs, and means for communicating with the base station based on the feedback message.

A non-transitory computer-readable medium storing code for wireless communications at a UE is described. The code may include instructions executable by a processor to transmit a set of multiple uplink messages to a base station over a set of TTIs, receive, from the base station, a feedback message indicating a quality of uplink continuity of the UE based on the set of multiple uplink messages, where the uplink continuity corresponds to a variation of one or more uplink parameters associated with the set of multiple uplink messages over the set of TTIs, and communicate with the base station based on the feedback message.

In some examples of the method, apparatuses, and non-transitory computer-readable medium described herein, receiving the feedback message may include operations, features, means, or instructions for receiving an indication of a phase drift, an amplitude variation, a timing advance variation, or a combination thereof observed by the base station over the set of TTIs based on the set of multiple uplink messages.

In some examples of the method, apparatuses, and non-transitory computer-readable medium described herein, receiving the feedback message may include operations, features, means, or instructions for receiving an indication of a time length associated with uplink continuity of the UE observed by the base station over the set of TTIs based on the set of multiple uplink messages.

In some examples of the method, apparatuses, and non-transitory computer-readable medium described herein, receiving the feedback message may include operations, features, means, or instructions for receiving an indication of presence or absence of phase continuity, amplitude continuity, or both observed by the base station over the set of TTIs based on the set of multiple uplink messages.

In some examples of the method, apparatuses, and non-transitory computer-readable medium described herein, receiving the feedback message may include operations, features, means, or instructions for receiving downlink control information including a set of bits indicating a phase drift value, an amplitude variation value, a timing advance variation value, a length of time of uplink continuity, or any combination thereof.

Some examples of the method, apparatuses, and non-transitory computer-readable medium described herein may further include operations, features, means, or instructions for transmitting a UE capability message to the base station, the UE capability message indicating a capability of the UE to maintain uplink continuity for uplink transmissions.

In some examples of the method, apparatuses, and non-transitory computer-readable medium described herein, the capability of the UE corresponds to an uplink continuity classification of a set of uplink continuity classifications associated with uplink continuity for the UE.

In some examples of the method, apparatuses, and non-transitory computer-readable medium described herein, communicating with the base station may include operations, features, means, or instructions for modifying the capability of the UE to maintain uplink continuity for uplink transmissions based on the feedback message from the base station and transmitting a UE capability message indicating the modified capability of the UE to maintain uplink continuity for uplink transmissions.

In some examples of the method, apparatuses, and non-transitory computer-readable medium described herein, receiving the feedback message may include operations, features, means, or instructions for receiving the feedback message via radio resource control (RRC) signaling, a medium access control (MAC) control element (MAC-CE), downlink control information (DCI), or a combination thereof.

In some examples of the method, apparatuses, and non-transitory computer-readable medium described herein, the one or more uplink parameters includes a phase, an amplitude, a timing advance, or any combination thereof associated with the set of multiple uplink messages.

A method for wireless communications at a base station is described. The method may include receiving, from a UE, a set of multiple uplink messages over a set of TTIs, transmitting, to the UE, a feedback message indicating a quality of uplink continuity of the UE based on the set of multiple uplink messages, where the uplink continuity corresponds to a variation of one or more uplink parameters associated with the set of multiple uplink messages over the set of TTIs, and communicating with the UE based on the feedback message.

An apparatus for wireless communications at a base station is described. The apparatus may include a processor, memory coupled with the processor, and instructions stored in the memory. The instructions may be executable by the processor to cause the apparatus to receive, from a UE, a set of multiple uplink messages over a set of TTIs, transmit, to the UE, a feedback message indicating a quality of uplink continuity of the UE based on the set of multiple uplink messages, where the uplink continuity corresponds to a variation of one or more uplink parameters associated with the set of multiple uplink messages over the set of TTIs, and communicate with the UE based on the feedback message.

Another apparatus for wireless communications at a base station is described. The apparatus may include means for receiving, from a UE, a set of multiple uplink messages over a set of TTIs, means for transmitting, to the UE, a feedback message indicating a quality of uplink continuity of the UE based on the set of multiple uplink messages, where the uplink continuity corresponds to a variation of one or more uplink parameters associated with the set of multiple uplink messages over the set of TTIs, and means for communicating with the UE based on the feedback message.

A non-transitory computer-readable medium storing code for wireless communications at a base station is described. The code may include instructions executable by a processor to receive, from a UE, a set of multiple uplink messages over a set of TTIs, transmit, to the UE, a feedback message indicating a quality of uplink continuity of the UE based on the set of multiple uplink messages, where the uplink continuity corresponds to a variation of one or more uplink parameters associated with the set of multiple uplink messages over the set of TTIs, and communicate with the UE based on the feedback message.

In some examples of the method, apparatuses, and non-transitory computer-readable medium described herein, transmitting the feedback message may include operations, features, means, or instructions for transmitting an indication of a phase drift, an amplitude variation, a timing advance variation, or a combination thereof observed by the base station over the set of TTIs based on the set of multiple uplink messages.

In some examples of the method, apparatuses, and non-transitory computer-readable medium described herein, transmitting the feedback message may include operations, features, means, or instructions for transmitting an indication of a time length associated with uplink continuity of the UE observed by the base station over the set of TTIs based on the set of multiple uplink messages.

In some examples of the method, apparatuses, and non-transitory computer-readable medium described herein, transmitting the feedback message may include operations, features, means, or instructions for transmitting an indication of presence or absence of phase continuity, amplitude continuity, or both observed by the base station over the set of TTIs based on the set of multiple uplink messages.

In some examples of the method, apparatuses, and non-transitory computer-readable medium described herein, transmitting the feedback message may include operations, features, means, or instructions for transmitting downlink control information including a set of bits indicating a phase drift value, an amplitude variation value, a timing advance variation value, a length of time of uplink continuity, or any combination thereof.

In some examples of the method, apparatuses, and non-transitory computer-readable medium described herein, communicating with the UE may include operations, features, means, or instructions for selecting an uplink enhancement procedure for communicating with the UE based on the quality of the uplink continuity of the UE.

In some examples of the method, apparatuses, and non-transitory computer-readable medium described herein, the uplink enhancement procedure includes bundling of reference signals across one or more uplink transmissions.

Some examples of the method, apparatuses, and non-transitory computer-readable medium described herein may further include operations, features, means, or instructions for receiving a UE capability message from the UE, the UE capability message indicating a capability of the UE to maintain uplink continuity for uplink transmissions.

In some examples of the method, apparatuses, and non-transitory computer-readable medium described herein, the capability of the UE corresponds to an uplink continuity classification of a set of uplink continuity classifications associated with uplink continuity for the UE.

Some examples of the method, apparatuses, and non-transitory computer-readable medium described herein may further include operations, features, means, or instructions for transmitting an indication of a second uplink continuity classification of the set of uplink continuity classifications based on the feedback message, where the second uplink continuity classification may be different from the uplink continuity classification.

Some examples of the method, apparatuses, and non-transitory computer-readable medium described herein may further include operations, features, means, or instructions for receiving a second UE capability message indicating a modified capability of the UE to maintain uplink continuity for uplink transmissions based on the feedback message, the modified capability of the UE based on the variation.

In some examples of the method, apparatuses, and non-transitory computer-readable medium described herein, transmitting the feedback message may include operations, features, means, or instructions for transmitting the feedback message via RRC signaling, a MAC-CE, DCI, or a combination thereof.

In some examples of the method, apparatuses, and non-transitory computer-readable medium described herein, the one or more uplink parameters includes a phase, an amplitude, a timing advance, or any combination thereof associated with the set of multiple uplink messages.

DETAILED DESCRIPTION

Figure 1:
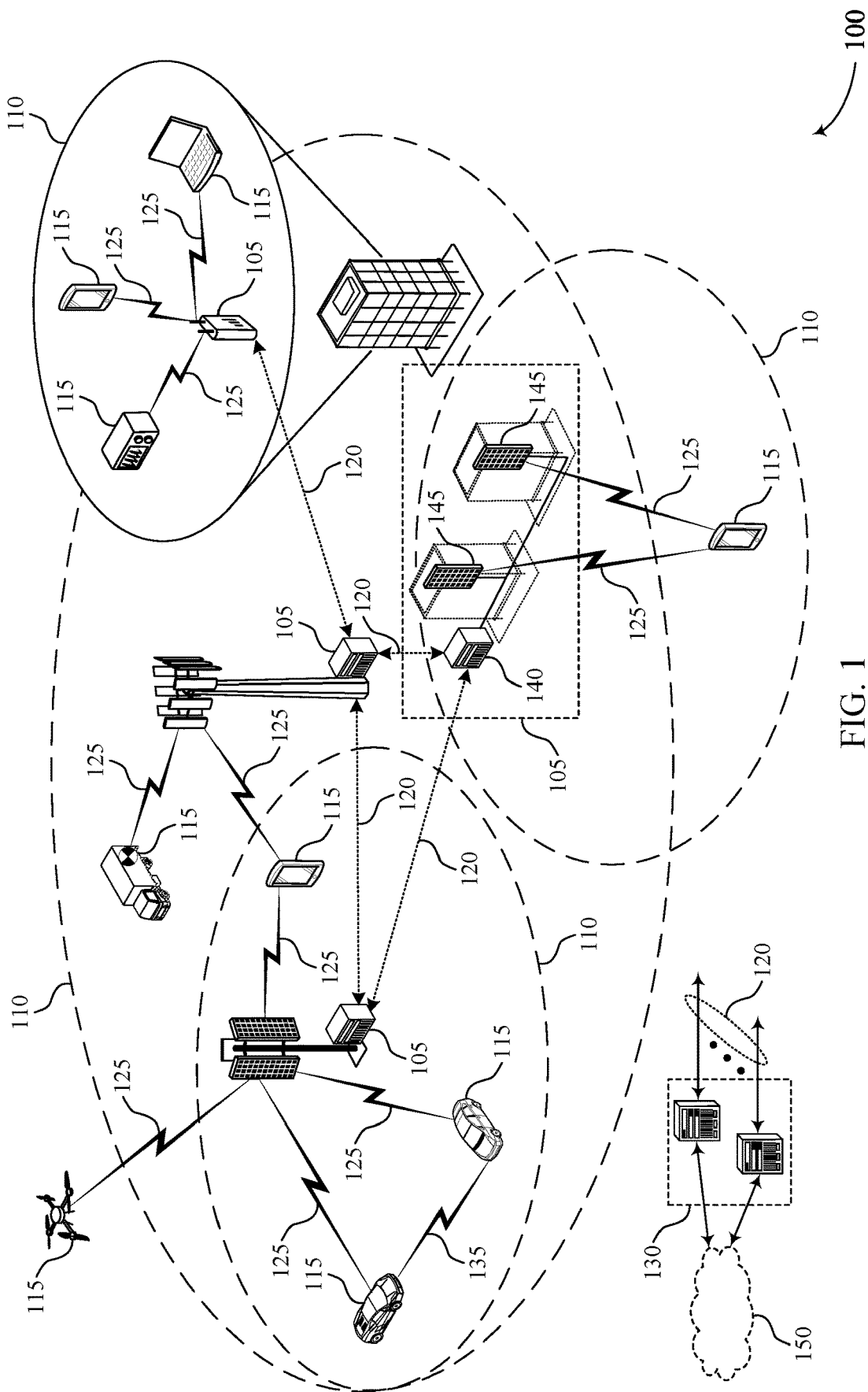
FIG. 1 illustrates an example of a wireless communications system that supports network feedback for uplink continuity in accordance with aspects of the present disclosure.

A user equipment (UE) and a base station may be configured to perform joint channel estimation by using demodulation reference signal (DMRS) bundling across uplink transmissions such as physical uplink control channel (PUCCH) repetitions. In some cases, DMRS bundling for uplink transmissions (e.g., PUCCH, physical uplink shared channel (PUSCH)) may be associated with one or more parameters (e.g., uplink continuity parameters) such as phase continuity, amplitude continuity, and a timing advance continuity. When DMRS bundling is utilized, a base station may receive multiple DMRSs across multiple uplink transmissions (e.g., PUCCH repetitions) and bundle the multiple DMRSs as part of a joint channel estimation procedure. The base station may determine a quality of uplink continuity across the multiple uplink transmissions by measuring variations of the one or more parameters. In some examples, the amount that the one or more parameters vary may be used to determine or classify a quality of the uplink continuity observed or experienced by the base station across the multiple uplink transmissions. For instance, high quality uplink continuity may correspond to small variations (e.g., variations below a threshold) of the one or more parameters. Conversely, low quality uplink continuity (e.g., or lack of uplink continuity) may be associated with large variations (e.g., variations above a threshold) of the one or more parameters. In some cases, uplink continuity may be leveraged by the base station based on a capability report transmitted by the UE. For example, the UE may indicate a capability to maintain a degree or classification of uplink continuity to the base station.

However, the UE may not be able to track the quality of uplink continuity (e.g., phase continuity, amplitude continuity, timing advance continuity) during communications with the base station (e.g., in real time or near real time), which may result in an uplink continuity mismatch between the UE (e.g., what the UE is capable of maintaining) and the base station (e.g., what the base station observes). For example, uplink transmissions from the UE to the base station may initially correspond to a degree of uplink continuity, which may be supported or indicated by the UE to the base station. One or more uplink parameters associated with uplink continuity, however, may vary such that the uplink continuity as initially determined or indicated by the UE may be different from the uplink continuity observed by the base station. That is, there may be a mismatch between uplink continuity capability assumptions at the UE and the uplink continuity observed at the base station. Mismatches in uplink continuity at the base station and the UE may lead to inaccurate channel estimation, increased latency, and an overall decrease in network efficiency.

Techniques to enable a base station to send a feedback message to a UE indicating a quality of uplink continuity are described in accordance with aspects of the present disclosure. The base station may perform one or more measurements, analyses, or both, to determine a quality of uplink continuity associated with the UE. For example, the base station may determine that a variation of one or more uplink parameters associated with uplink continuity (e.g., phase continuity, amplitude continuity, timing advance continuity) exceeds one or more thresholds, where the thresholds may correspond to classifications (e.g., degrees) of uplink continuity. Based on the determinations at the base station, the base station may transmit a feedback message to the UE indicating a status of uplink continuity (e.g., a quality of uplink continuity as observed by the base station), one or more variations or values of the variation(s) of one or more uplink parameters, an observed classification of uplink continuity, and the like.

The feedback message may include other information, such as observed phase drift, observed amplitude variation, and observed timing advance variation. Additionally, or alternatively, the feedback message may include an indication of a presence of phase continuity, a presence of amplitude continuity, a length of time in which uplink continuity has been maintained, or any combination thereof. By utilizing techniques for indicating the quality of uplink continuity to the UE, the UE may have real time information to be able to address mismatches in uplink continuity (e.g., due to phase drift). In other words, the UE may be informed when uplink continuity is not being maintained at an acceptable level and the base station may cease DMRS bundling of uplink transmission from the UE. The described techniques provide for informing the UE of the quality of uplink continuity being maintained or observed by the base station. By keeping the UE informed of uplink continuity, overall network efficiency may increase due to improved channel estimation.

Aspects of the disclosure are initially described in the context of wireless communications systems. Aspects of the disclosure are further illustrated by and described with reference to a bitmap and a process flow. Aspects of the disclosure are further illustrated by and described with reference to apparatus diagrams, system diagrams, and flowcharts that relate to network feedback for uplink continuity.

FIG. 1 illustrates an example of a wireless communications system 100 that supports network feedback for uplink continuity in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some instances, the base station 105 may perform joint channel estimation utilizing DMRS bundling and uplink continuity across multiple uplink transmissions from a UE 115. In some cases, DMRS bundling may be performed under the assumption of one or more uplink continuity classifications. For example, the base station 105 may perform DMRS bundling and joint channel estimation if the UE 115 indicates an uplink continuity classification conducive to performing DMRS bundling of uplink communications. Specifically, the UE 115 may indicate (e.g., via a capability message) a capability to maintain a given classification of uplink continuity (e.g., small variations in phase continuity, amplitude continuity, constant timing advance). Based on the capability message, the base station 105 may perform joint channel estimation using DMRS bundling corresponding to uplink transmissions from the UE 115.

In some examples, the base station 105 may observe a quality associated with the UE 115. That is, the base station 105 may monitor variations in one or more uplink parameters. For example, the base station 105 may monitor variations in phase continuity (e.g., phase drift). Additionally, or alternatively, the base station 105 may monitor uplink transmissions from the UE 115 for variations in amplitude continuity, timing advance, or both. In some cases, the base station 105 may send a feedback message to the UE 115 indicating a quality of uplink continuity, an indication of variations in one or more uplink parameters, or the like. In some instances, the base station 105 may determine that variations of the one or more uplink parameters associated with uplink continuity exceeds one or more thresholds, where the thresholds may correspond to classifications (e.g., quality) of uplink continuity. Based on the determinations at the base station 105, the base station 105 may transmit the feedback message to the UE indicating a status of uplink continuity, the variation of one or more uplink parameters, one or more classifications, and the like. In some cases, the feedback message may be transmitted over an RRC message (e.g., encoded in a bitmap). In other cases, the base station 105 may send the feedback message over MAC-CE messaging, or indicate feedback information over downlink control information (DCI), or both (e.g., partial feedback via MAC-CE and remaining feedback via DCI).

The feedback message may include other quantities, such as an indication of a presence of phase continuity, a presence of amplitude continuity, a length of time in which uplink continuity has been maintained, or any combination thereof. By utilizing techniques for indicating the quality of uplink continuity to the UE 115, the UE 115 may have real time information to be able to address mismatches in uplink continuity (e.g., due to phase drift). In other words, the UE 115 may be informed when uplink continuity is not being maintained at a previously indicated (e.g., or assumed) level. Accordingly, the UE 115 may change future capability indications based on the feedback message from the base station 105. Additionally, the base station 105 may update assumptions corresponding to the capability of the UE 115 based on the feedback message. The described techniques provide for updating the UE 115 of the quality of uplink continuity being maintained. By keeping the UE 115 informed of uplink continuity, overall network efficiency may increase.

Figure 2:
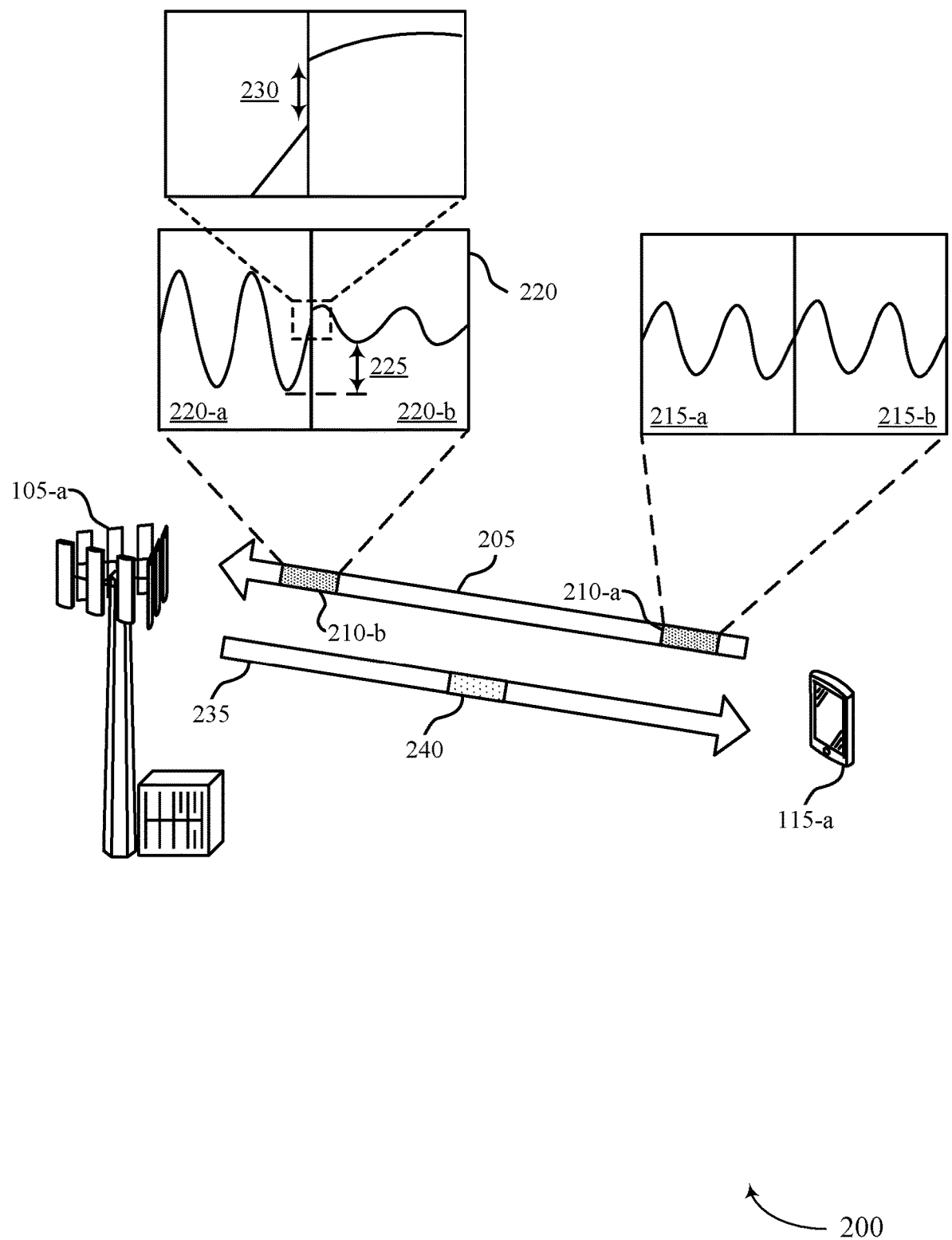
FIG. 2 illustrates an example of a wireless communications system that supports network feedback for uplink continuity in accordance with aspects of the present disclosure.

FIG. 2 illustrates an example of a wireless communications system 200 that supports network feedback for uplink continuity in accordance with aspects of the present disclosure. The wireless communications system 200 may implement or be implemented by one or more aspects of the wireless communications system 100. For example, the wireless communications system 200 may include a UE 115-a and a base station 105-a, which may be examples of the UE 115 and the base station 105 as described with reference to FIG. 1. It should be noted that, while examples are discussed below, any number of devices and device types may be used for implementations described in the present disclosure.

The base station 105-a and the UE 115-a may communicate over one or more communication links. For example, the base station 105-a may communicate with the UE 115-a over a downlink 235 and the UE 115-a may communicate with the base station 105-a over an uplink 205. In some examples, the UE 115-a may indicate a capability of uplink continuity supported by the UE 115-a, which may indicate the ability of the UE 115-a to support a given classification (e.g., variation of one or more parameters relative to a threshold) for uplink transmissions, which the base station 105-a may use to determine whether to perform DMRS bundling of uplink transmissions for joint channel estimation at the base station 105-a. That is, the UE 115-a may perform uplink transmissions such that the base station 105-a may collectively utilize DMRS from different times or messages (e.g., using DMRS from different TTIs or uplink messages from the UE 115-a) to estimate a channel (e.g., to perform joint channel estimation). Collectively utilizing DMRS across multiple TTIs or uplink messages may be referred to as DMRS bundling. In some cases, DMRS bundling may be used by the base station 105-a across multiple uplink transmissions or repetitions (e.g., PUCCH repetitions, PUSCH repetitions). Uplink continuity may be associated with one or more parameters such as phase continuity, amplitude continuity, and a timing advance continuity, which, if a UE 115-a is capable of maintaining a certain level, classification, or degree of uplink continuity, may enable the base station 105-a to use DMRS bundling (e.g., combining DMRS received from different TTIs or uplink messages) and perform joint channel estimation. The quality of uplink continuity may correspond to the degree of variation of one or more parameters and depending on the quality of uplink continuity, the base station 105-a may determine whether to perform DMRS bundling as part of joint channel estimation. For instance, if the UE 115-a is unable to maintain a given class or level of uplink continuity (e.g., a given (e.g., low) quality of uplink continuity), the base station 105-a may determine not to perform DMRS bundling for joint channel estimation. If the UE 115-a maintains a given class or level of uplink continuity (e.g., a given (e.g., high) quality of uplink continuity), the base station 105-a may use DMRS bundling for joint channel estimation across multiple uplink transmissions from the UE 115-a.

The amount that the one or more parameters vary may be used to classify a quality of uplink continuity, where the quality of uplink continuity may have a direct correspondence to the ability to perform DMRS bundling at the base station 105-a. For example, high quality uplink continuity may correspond to small variations of the one or more parameters (e.g., when a variation of a parameter is below a threshold variation). Small variations of the one or more parameters may translate to small variations in uplink transmission parameters over a number of TTIs, which may result in to more efficient DMRS bundling. That is, small variations of the one or more parameters may correspond to more consistent uplink transmissions, which may enable more efficient DMRS bundling and, therefore, joint channel estimation. Conversely, low quality uplink continuity (e.g., lack of uplink continuity) may be associated with large variations of the one or more parameters (e.g., when a variation of a parameter is above a threshold variation). Large variations may result in one or more discontinuities in DMRS between TTIs, which may hinder DMRS bundling and, therefore, joint channel estimation at the base station 105-a.

In some cases, the UE 115-a may initially indicate a quality of uplink continuity to the base station 105-a based on a capability to maintain small variations in the one or more parameters. For example, the UE 115-a may initially determine that variations corresponding to the one or more parameters are small. Based on the variations of the one or more parameters being small, the UE 115-a may indicate a capability to maintain high quality uplink continuity to the base station 105-a. In some cases, the UE 115-a may indicate a classification associated with the quality of uplink continuity. For example, the UE 115-a may indicate an uplink continuity classification of "high" based at least in part on the capability to maintain high uplink continuity and one or more thresholds (e.g., less than 1 dB of amplitude variation across TTIs). Based on the indicated capability, the base station 105-a may perform joint channel estimation of the uplink 205 by utilizing high quality uplink continuity to perform DMRS bundling.

In some cases, however, uplink continuity (e.g., variations of the one or more parameters) at the UE 115-a may differ from observed uplink continuity at the base station 105-a. For example, a transmitted uplink message 210-a transmitted at the UE 115-a may correspond to one or more TTIs (e.g., TTI 215-a and TTI 215-b), where the UE 115-a may determine that there are small or no variations of the one or more parameters (e.g., phase continuity, amplitude continuity, constant timing advance) across the TTI 215-a and the TTI 215-b. Small or no variations of the one or more parameters may correspond to uplink continuity across both the TTI 215-a and the TTI 215-b, as illustrated in FIG. 2.

However, due to one or more phenomena, such as channel conditions (e.g., fading, attenuation, blocking), there may be an uplink continuity mismatch between the transmitted uplink message 210-a transmitted at the UE 115-a, and a received uplink message 210-b received at the base station 105-a. That is, the uplink continuity assumed at the UE 115-a (e.g., based on small variations of the one or more parameters corresponding to the transmitted uplink message 210-a) may differ from uplink continuity observed at the base station 105-a (e.g., based on observed variations of the one or more parameters corresponding to the received uplink message 210-b). Likewise, the classification of uplink continuity as indicated by the UE 115-a may differ from observed classification of uplink continuity at the base station 105-a. For example, the base station 105-a may receive the uplink message 210-b, which may span a TTI 220-a and a TTI 220-b. In some cases, the base station 105-a may determine that a parameter of the one or more parameters corresponding to uplink continuity exhibits large variations between the TTI 220-a and the TTI 220-b. For example, the base station 105-a may determine that an amplitude associated with the received uplink message 210-b undergoes an amplitude variation 225 across the TTI 220-a and the TTI 220-b, as illustrated in FIG. 2. Additionally, or alternatively, the base station 105-a may determine that a phase associated with the received uplink message 210-b undergoes a phase variation 230 (e.g., due to phase drift) across the TTI 220-a and the TTI 220-b.

In other examples, the base station 105-a may determine that timing advances associated with the received uplink message 210-b undergoes variation (e.g., does not remain constant across TTI 220-a and TTI 220-b). Additionally, or alternatively, the base station 105-a may perform one or more additional measurements to classify uplink continuity. For example, the base station 105-a may determine a maximum length of time (e.g., a number of TTIs, a duration of time) where a classification of uplink continuity (e.g., high uplink continuity) was observed. Additionally, or alternatively, the base station 105-a may determine a presence or absence of phase continuity, amplitude continuity, or both, corresponding to the received uplink message 210-b.

Based on the observations of the variations of the one or more parameters, or additional measurements performed, at the base station 105-a, the base station 105-a may determine to reclassify the ability of the UE 115-a to maintain uplink continuity. For example, while the UE 115-a may have indicated high uplink continuity (e.g., low variation of the one or more parameters and one or more thresholds), the base station 105-a may reclassify the uplink continuity as "low," based on large variations observed at the base station 105-a. That is, there may exist a mismatch between assumptions of uplink continuity at the UE 115-a and observed uplink continuity at the base station 105-a.

In some examples, the base station 105-a may transmit a feedback message 240 to the UE 115-a indicating the classification of uplink continuity (e.g., low uplink continuity) observed by the base station 105-a. In some cases, the feedback message 240 may be transmitted as part of higher layer signaling (e.g., RRC). In some examples, the base station 105-a may partially send the feedback message 240 over MAC-CE. In other examples, the base station 105-a may utilize one or more bitfields in DCI to implicitly or explicitly indicate information about the quality of uplink continuity to the UE 115-a.

Additionally, or alternatively, the base station 105-a may update assumptions made regarding the capability of the UE 115-a to maintain uplink continuity based on the feedback message 240 that the base station 105-a transmits to the UE 115-a. In some cases, the base station 105-a may change related procedures (e.g., whether to apply DMRS bundling for uplink reception or not) accordingly. For example, if the base station 105-a determines uplink continuity is low, the base station 105-a may cease DMRS bundling for uplink reception. In some cases, the UE 115-a may change future capability indications based on the feedback message 240 from the base station 105-a.

Figure 3:
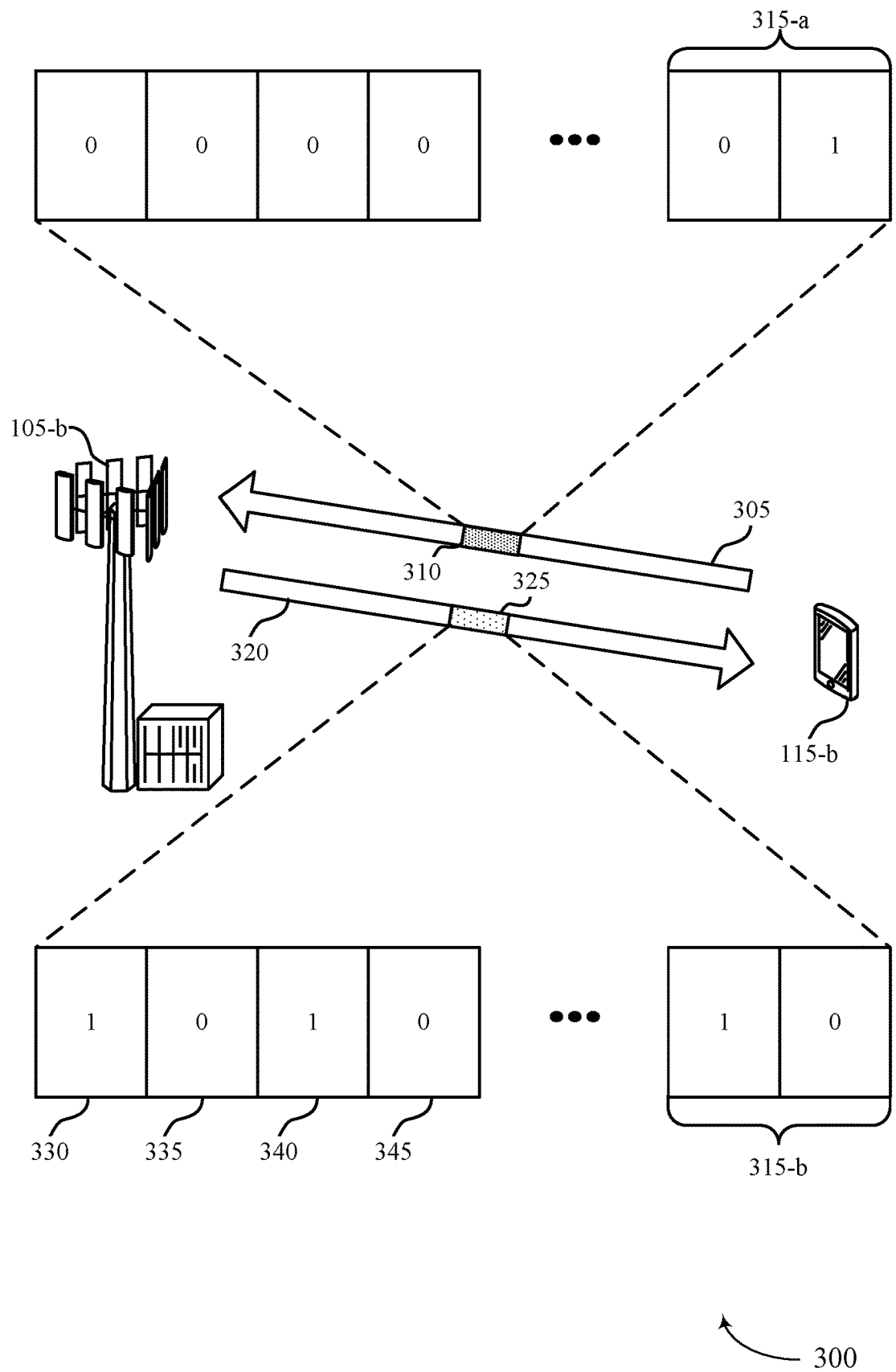
FIG. 3 illustrates an example of a bitmap that supports network feedback for uplink continuity in accordance with aspects of the present disclosure.

FIG. 3 illustrates an example of a bitmap 300 that supports network feedback for uplink continuity in accordance with aspects of the present disclosure. The bitmap 300 may be utilized by one or more aspects of the wireless communications system 100 and the wireless communications system 200. For example, the bitmap 300 may correspond to communications between a UE 115-b and a base station 105-b, which may be examples of the UE 115 and the base station 105 as described with reference to FIG. 1. It should be noted that, while examples are discussed below, any number of devices and device types may be used to accomplish implementations described in the present disclosure.

The base station 105-b and the UE 115-b may communicate over one or more communication links. For example, the base station 105-b may communicate with the UE 115-b over a downlink 320 and the UE 115-b may communicate with the base station 105-b over an uplink 305. In some examples, the UE 115-b may indicate an uplink continuity capability (e.g., whether the UE 115-b is capable of maintaining a class or level of uplink continuity that supports DMRS bundling of uplink transmissions for joint channel estimation at the base station 105-b) via a capability message 310. The capability message 310 may include one or more bitfields corresponding to one or more parameters associated with a quality of uplink continuity. For example, the capability message 310 may include a set of bits indicating a phase drift value, an amplitude variation value, a timing advance variation value, a length of time of uplink continuity, or any combination thereof. For example, a bit corresponding to phase drift may be set to 0, indicating a lack of phase drift and, therefore, the existence of phase continuity over a time period (e.g., one or more TTIs or uplink messages). Additionally, or alternatively, the capability message 310 may include an indication of a presence or absence of phase continuity, amplitude continuity, or both. For example, if a bit corresponding to a presence or absence of amplitude continuity is 0, amplitude continuity may exist over one or more TTIs or uplink messages.

In some examples, the capability message 310 may include one or more bits corresponding to an uplink continuity classification 315-a. The uplink continuity classification 315-a may be based on the one or more parameters corresponding to uplink continuity and one or more thresholds. For example, the UE 115-b may indicate, via the capability message 310 that the UE 115-b may support a class 1 (e.g., high level) uplink continuity, which may correspond to one or more parameters being below respective thresholds. For instance, class 1 uplink continuity may correspond to a phase variation being below a phase variation threshold (e.g., 30 degrees), an amplitude variation being below an amplitude variation threshold (e.g., 1 dB), or a timing advance variation being below a timing advance threshold (e.g., 1 ms). Class 2 uplink continuity (e.g., low level) may correspond to a phase variation being in a phase range (e.g., between phase variation thresholds, such as between 30 and 45 degrees), an amplitude variation being in an amplitude range (e.g., between amplitude variation thresholds, such as between 1 dB and 2 dB), or a timing advance variation being in a timing advance range (e.g., between timing advance thresholds, such as between 1 ms and 2 ms). Based on the one or more parameters, the UE 115-b may classify the quality of uplink continuity as high or low. Other levels (e.g., medium, medium-high) or classes (class 3, class 4) may be considered and may correspond to different thresholds or ranges for one or more parameters. The classification may be indicated using one or more bitfields such as within an uplink continuity classification 315-a. In some examples, such as those illustrated in FIG. 3, a classification of high may correspond to a first bit in the uplink continuity classification 315-a being equal to zero, and a second bit in the uplink continuity classification 315-a being equal to 1. However, different values, number of bits, and structures of bitmaps may be utilized to accomplish techniques described herein.

Additionally, or alternatively, the uplink continuity classification 315-a may be determined based on variations of one or more parameters with respect to one or more thresholds. For example, the UE 115-b may determine a phase corresponding to uplink communications varies by plus or minus 5 degrees, amplitude varies by plus or minus 1 dB, and timing advance variation of 0-1 ms. Additionally, or alternatively, the UE 115-b may determine that the variations satisfy one or more thresholds. For example, a high uplink continuity classification may be based on whether the UE 115-b is capable of phase variations are below 7 degrees, observed amplitude variations are below 2 dB, and observed timing advance variations are below 2 ms. Based on the variations and the thresholds, the UE 115-b may classify the quality of uplink continuity as high. In some cases, however, there may exist an uplink continuity mismatch between the capability message 310 and uplink continuity observed at the base station 105-b. For example, the base station 105-b may observe larger or smaller variations (e.g., a different classification) corresponding to the one or more parameters than that which is indicated by the UE 115-b. That is, while the UE 115-b may indicate a classification of high quality uplink continuity in the uplink continuity classification 315-a, the base station 105-b may observe different variations that may correspond to a different uplink continuity classification. For example, the base station 105-b may observe different, larger phase variation (e.g., a phase variation of plus or minus 15 degrees) that may not satisfy one or more thresholds. Additionally, the base station 105-b may determine that there is an absence of phase continuity corresponding to uplink transmissions from the UE 115-b. In such cases, the base station 105-b may determine a different quality of uplink continuity (e.g., low, very low).

Based on the determination of the quality of uplink continuity being low, the base station 105-b may generate a feedback message 325 and transmit the feedback message 325 to the UE 115-b. In some examples, the feedback message 325 may include one or more bitfields indicating one or more parameters corresponding to the quality of uplink continuity. For instance, the base station may determine that there is a mismatch between phase variation as indicated by the UE 115-b and the phase variation observed at the base station 105-b. As such, the base station 105-b may indicate a larger phase variation to the UE 115-b within the feedback message 325. For example, a bitfield 330 within the feedback message 325 may indicate a presence of large phase variation (e.g., by being equal to 1). The base station 105-b may further indicate small variations in amplitude via a bitfield 335 (e.g., by being equal to 0). Additionally, the base station 105-b may indicate the absence of phase continuity via a bitfield 340 (e.g., if the bitfield 340 is equal to 1, there may be an absence of phase continuity). The base station 105-b may also indicate the presence of amplitude continuity by indicating, via a bitfield 345 (e.g., if the bitfield 345 is equal to 0, amplitude continuity may be present). Additionally, or alternatively, the base station 105-b may indicate other parameters within the feedback message 325, such as timing advance variation, how long amplitude continuity has been observed, how long phase continuity has been observed, and the like. It should be noted that, while particular examples (e.g., bitmaps, bitfields) are discussed within the present disclosure, any arrangement of bits, bitmaps, bitfield mappings, and the like may be performed in any combination, and are not limited to the examples discussed herein.

Based on the observed quality of uplink continuity at the base station 105-b and the one or more parameters indicated within the feedback message 325, the base station 105-b may also indicate an uplink continuity classification 315-b in the feedback message 325. In some examples, such as the previous, the uplink continuity classification 315-b may differ from the uplink continuity classification 315-a as indicated by the UE 115-*b*. In the present example, the base station 105 a may determine a classification of low corresponding to uplink continuity. The base station may indicate a low classification of uplink continuity via the uplink continuity classification 315-*b* (e.g., by a first bitfield of the uplink continuity classification 315*b* being equal to 1, and a second bitfield being equal to 0). Additionally, or alternatively, the base station 105-*b* may select an uplink enhancement procedure for communicating with the UE 115-*b* based on the quality of uplink continuity observed at the base station 105-*b*.

The base station 105-*b* may transmit the feedback message 325 to the UE 115-*b* (e.g., via RRC, MAC-CE, DCI, or a combination thereof), enabling real time resolution of uplink continuity quality mismatches between the UE 115-*b* and the base station 105-*b*. For example, based on the feedback message 325, the UE 115-*b* may perform one or more actions (e.g., modifications) to future capability messages to the base station 105-*b*. For example, the UE 115-*b* may determine that the quality of uplink continuity as observed by the base station 105-*b* is lower than previously indicated in the capability message 310. Based on differing uplink continuity classifications, the UE 115-*b* may modify one or more aspects corresponding to a capability to maintain uplink continuity at the UE 115-*b*. Additionally, or alternatively, the UE 115-*b* may transmit a second capability message indicating a modified capability to maintain uplink continuity to the base station 105-*b*.

Figure 4:
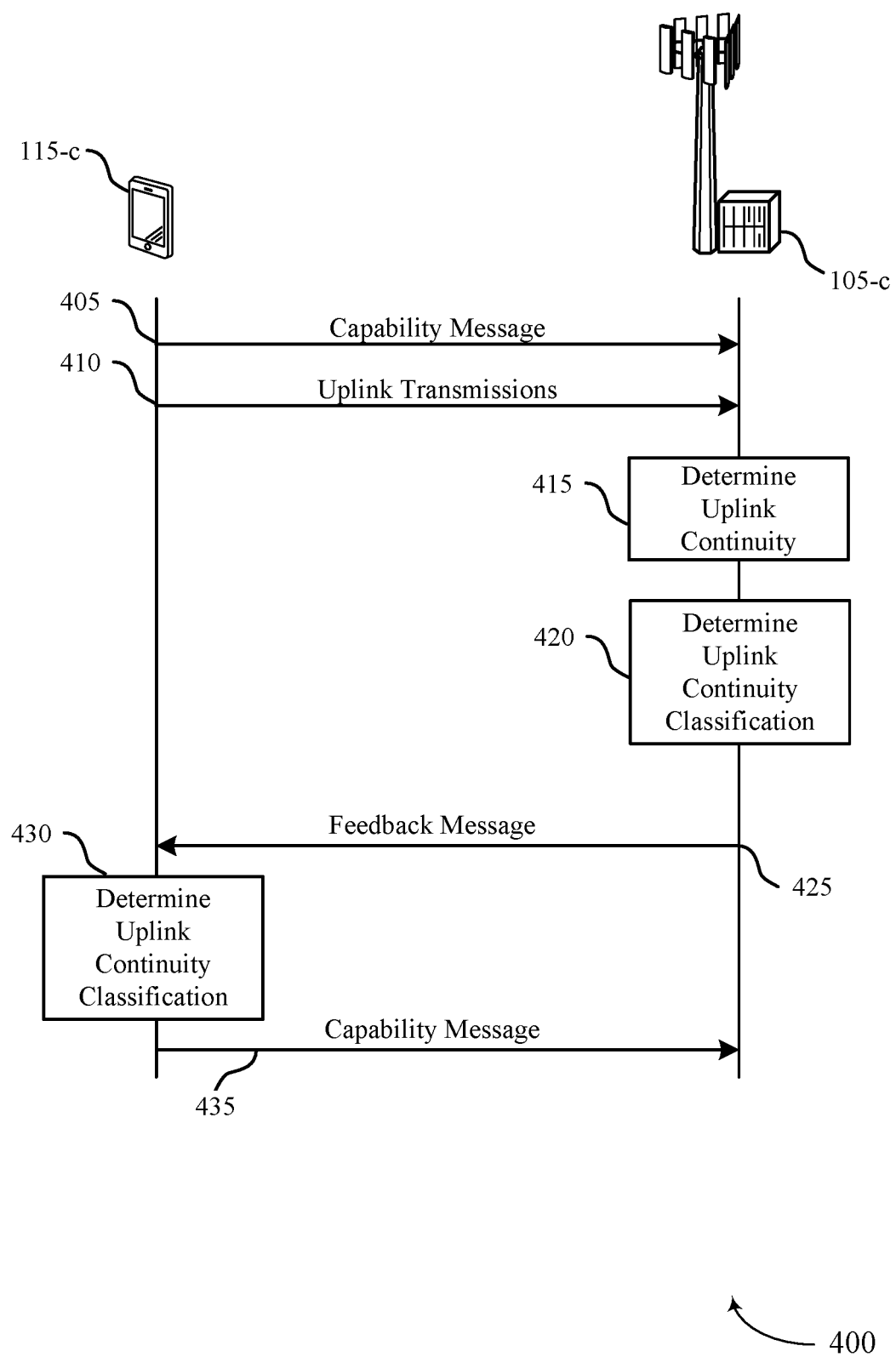
FIG. 4 illustrates an example of a process flow that supports network feedback for uplink continuity in accordance with aspects of the present disclosure.

FIG. 4 illustrates an example of a process flow 400 that supports network feedback for uplink continuity in accordance with aspects of the present disclosure. The process flow 400 may be implemented by one or more aspects of the wireless communications system 100 and the wireless communications system 200. For example, the process flow 400 may correspond to communications between a UE 115-*c* and a base station 105-*c*, which may be examples of the UE 115 and the base station 105 as described with reference to FIG. 1. It should be noted that, while examples are discussed below, any number of devices and device types may be used to accomplish implementations described in the present disclosure. In the following description of the process flow 400, operations between the UE 115-*c* and the base station 105-*c* may occur in a different order or at different times than as shown. Some operations may also be omitted from the process flow 400, and other operations may be added to the process flow 400.

At 405, the UE 115-*c* may transmit a capability message to the base station 105-*c* indicating a quality of uplink continuity. For example, the UE 115-*c* may indicate an uplink continuity classification of high (e.g., low phase variation, low amplitude variation, constant timing advance), corresponding to high uplink continuity. The base station 105-*c* may determine, based on the capability message at 405, to perform DMRS bundling by leveraging high uplink continuity. At 410, the UE 115-*c* may send uplink transmissions to the base station 105-*c*, where the base station 105-*c* may perform DMRS bundling over a set of TTIs corresponding to the uplink transmissions.

At 415, the base station 105-*c* may determine uplink continuity based on observing variations in one or more parameters corresponding to uplink continuity (e.g., phase continuity, amplitude continuity, timing advance). In some cases, the base station 105-*c* may further identify a presence or absence of phase continuity, a presence or absence of amplitude continuity, a length of time that uplink continuity has been maintained, and the like.

At 420, the base station 105-*c* may determine an uplink continuity classification based on observed variations of one or more parameters corresponding to uplink continuity. Additionally, or alternatively, the base station 105-*c* may determine the uplink continuity classification based on the presence or absence of phase continuity, the presence or absence of amplitude continuity, a length of time (e.g., multiple TTIs) uplink continuity has been maintained, or a combination thereof.

At 425, the base station 105-*c* may transmit a feedback message indicating the one or more parameters corresponding to uplink, the uplink continuity classification, or a combination thereof. In some cases, the uplink continuity classification may differ from an uplink continuity classification indicated by the UE 115-*c* (e.g., via the capability message at 405). Based on the feedback message, the UE 115-*c* may modify future capability messages (e.g., to prevent further uplink continuity mismatching between indicated uplink continuity and uplink continuity observed at the base station 105-*c*).

As such, at 435, the UE 115-*c* may transmit a capability message to the base station 105-*c* indicating a modified uplink continuity classification, modified one or more parameters, or a combination thereof, based on the feedback messaged received at 425.

Figure 5:
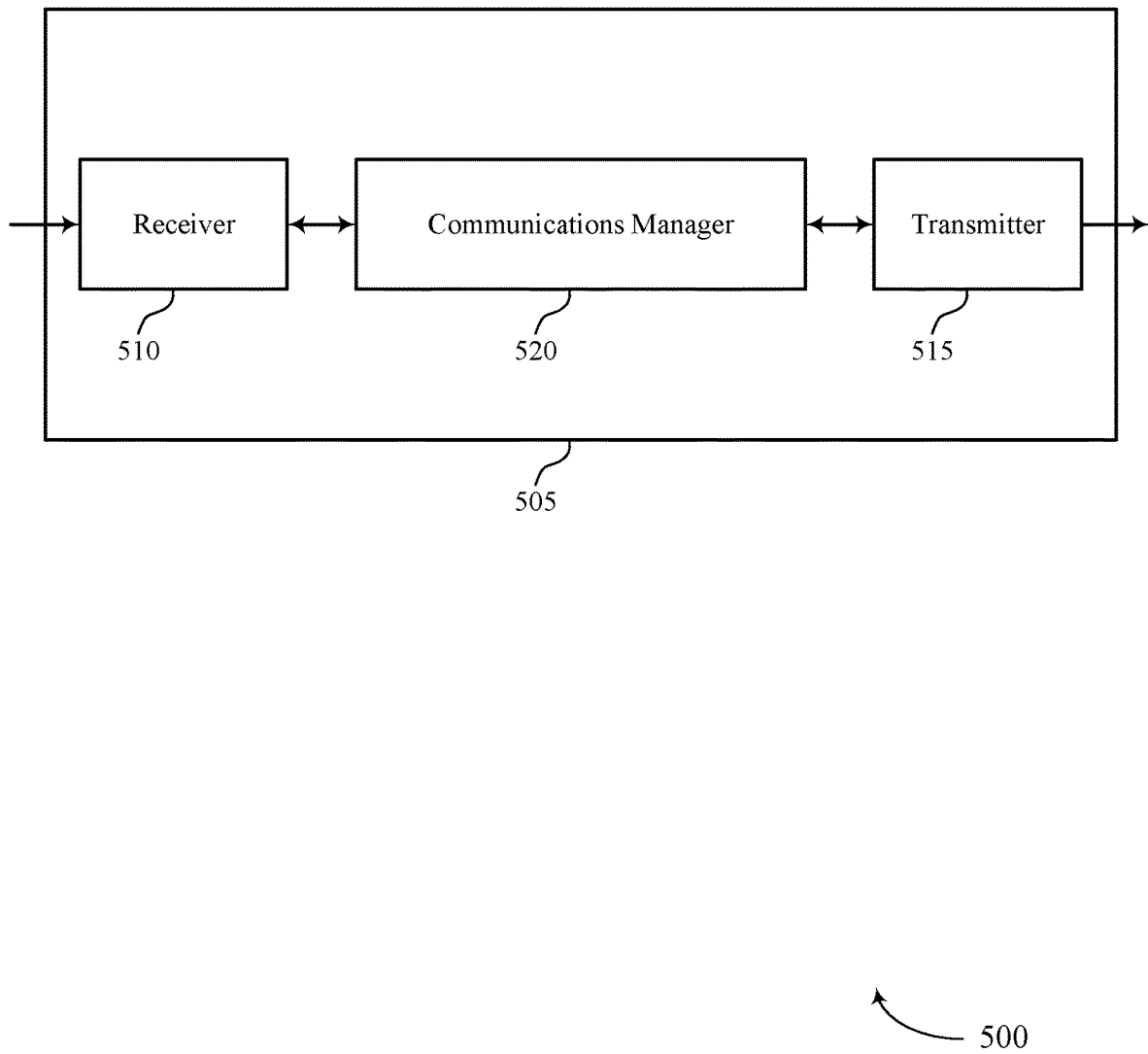
FIGS. 5 and 6 show block diagrams of devices that support network feedback for uplink continuity in accordance with aspects of the present disclosure.

FIG. 5 shows a block diagram 500 of a device 505 that supports network feedback for uplink continuity in accordance with aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to network feedback for uplink continuity). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to network feedback for uplink continuity). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of network feedback for uplink continuity as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 520 may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communications at a UE in accordance with examples as disclosed herein. For example, the communications manager 520 may be configured as or otherwise support a means for transmitting a set of multiple uplink messages to a base station over a set of TTIs. The communications manager 520 may be configured as or otherwise support a means for receiving, from the base station, a feedback message indicating a quality of uplink continuity of the UE based on the set of multiple uplink messages, where the uplink continuity corresponds to a variation of one or more uplink parameters associated with the set of multiple uplink messages over the set of TTIs. The communications manager 520 may be configured as or otherwise support a means for communicating with the base station based on the feedback message.

By including or configuring the communications manager 520 in accordance with examples as described herein, the device 505 (e.g., a processor controlling or otherwise coupled to the receiver 510, the transmitter 515, the communications manager 520, or a combination thereof) may support techniques for reduced processing and power consumption by reducing inaccurate channel estimation via network feedback of uplink continuity. Further, the described techniques support more efficient communications resource utilization and an overall reduction in signaling overhead by avoiding prolonged mismatches between indicated uplink continuity and observed uplink continuity, which may prevent additional signaling due to inaccurate channel estimation.

Figure 6:
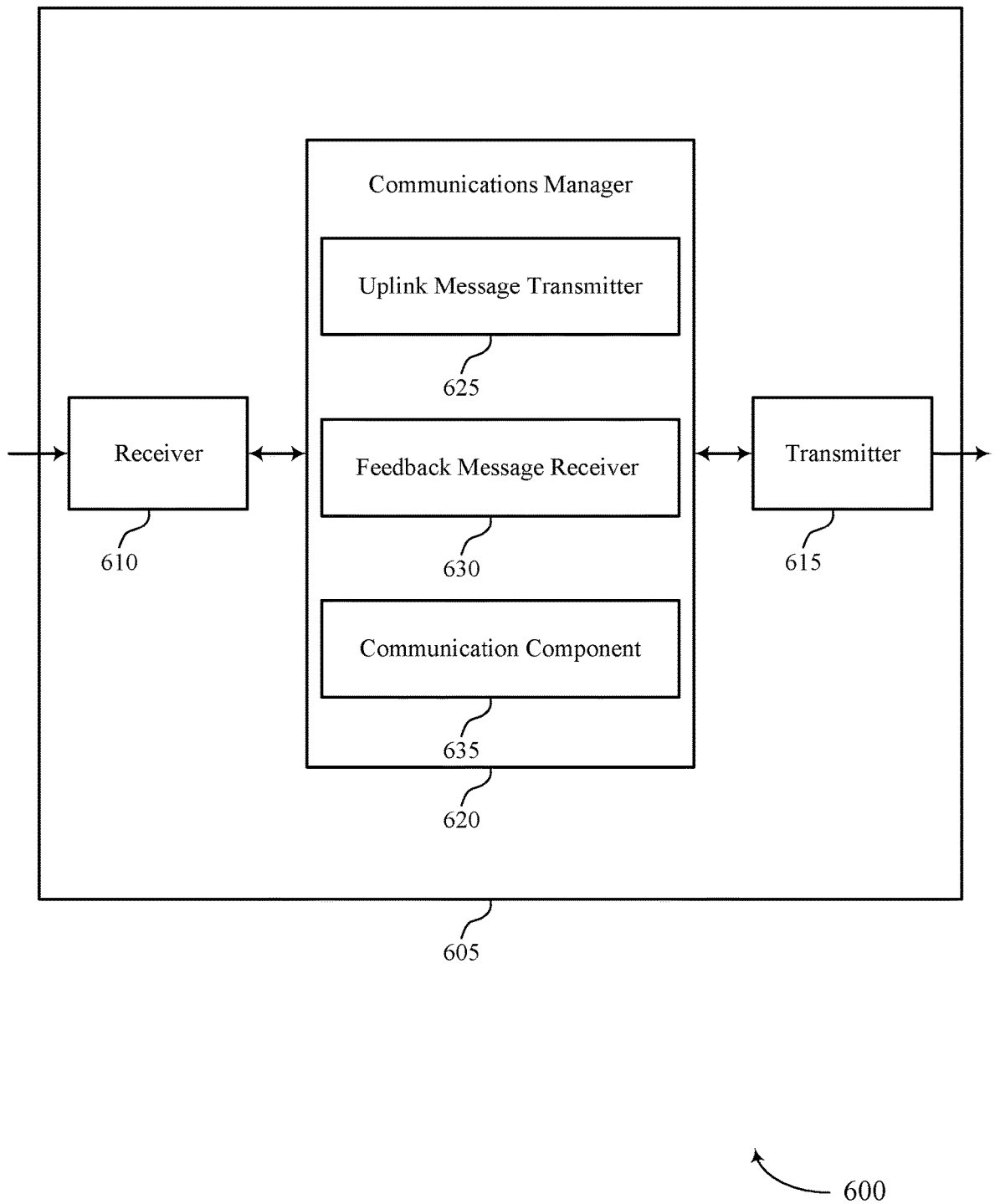

FIG. 6 shows a block diagram 600 of a device 605 that supports network feedback for uplink continuity in accordance with aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to network feedback for uplink continuity). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to network feedback for uplink continuity). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of network feedback for uplink continuity as described herein. For example, the communications manager 620 may include an uplink message transmitter 625, a feedback message receiver 630, a communication component 635, or any combination thereof. The communications manager 620 may be an example of aspects of a communications manager 520 as described herein. In some examples, the communications manager 620, or various components thereof, may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communications at a UE in accordance with examples as disclosed herein. The uplink message transmitter 625 may be configured as or otherwise support a means for transmitting a set of multiple uplink messages to a base station over a set of TTIs. The feedback message receiver 630 may be configured as or otherwise support a means for receiving, from the base station, a feedback message indicating a quality of uplink continuity of the UE based on the set of multiple uplink messages, where the uplink continuity corresponds to a variation of one or more uplink parameters associated with the set of multiple uplink messages over the set of TTIs. The communication component 635 may be configured as or otherwise support a means for communicating with the base station based on the feedback message.

Figure 7:
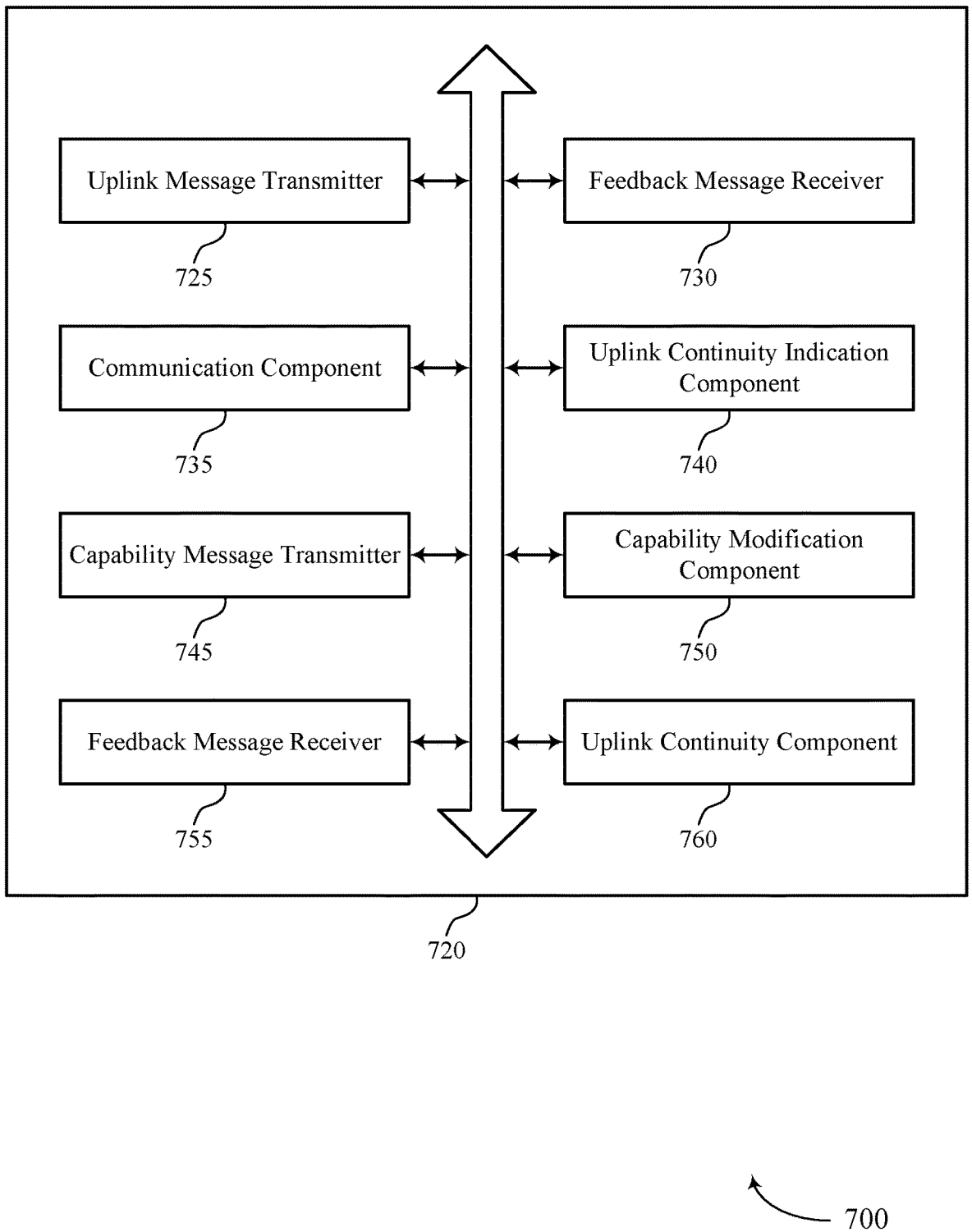
FIG. 7 shows a block diagram of a communications manager that supports network feedback for uplink continuity in accordance with aspects of the present disclosure.

FIG. 7 shows a block diagram 700 of a communications manager 720 that supports network feedback for uplink continuity in accordance with aspects of the present disclosure. The communications manager 720 may be an example of aspects of a communications manager 520, a communications manager 620, or both, as described herein. The communications manager 720, or various components thereof, may be an example of means for performing various aspects of network feedback for uplink continuity as described herein. For example, the communications manager 720 may include an uplink message transmitter 725, a feedback message receiver 730, a communication component 735, an uplink continuity indication component 740, a capability message transmitter 745, a capability modification component 750, a feedback message receiver 755, an uplink continuity component 760, or any combination thereof. Each of these components may communicate, directly or indirectly, with one another (e.g., via one or more buses).

The communications manager 720 may support wireless communications at a UE in accordance with examples as disclosed herein. The uplink message transmitter 725 may be configured as or otherwise support a means for transmitting a set of multiple uplink messages to a base station over a set of TTIs. The feedback message receiver 730 may be configured as or otherwise support a means for receiving, from the base station, a feedback message indicating a quality of uplink continuity of the UE based on the set of multiple uplink messages, where the uplink continuity corresponds to a variation of one or more uplink parameters associated with the set of multiple uplink messages over the set of TTIs. The communication component 735 may be configured as or otherwise support a means for communicating with the base station based on the feedback message.

In some examples, to support receiving the feedback message, the uplink continuity indication component 740 may be configured as or otherwise support a means for receiving an indication of a phase drift, an amplitude variation, a timing advance variation, or a combination thereof observed by the base station over the set of TTIs based on the set of multiple uplink messages.

In some examples, to support receiving the feedback message, the uplink continuity indication component 740 may be configured as or otherwise support a means for receiving an indication of a time length associated with uplink continuity of the UE observed by the base station over the set of TTIs based on the set of multiple uplink messages.

In some examples, to support receiving the feedback message, the uplink continuity indication component 740 may be configured as or otherwise support a means for receiving an indication of presence or absence of phase continuity, amplitude continuity, or both observed by the base station over the set of TTIs based on the set of multiple uplink messages.

In some examples, to support receiving the feedback message, the uplink continuity indication component 740 may be configured as or otherwise support a means for receiving downlink control information including a set of bits indicating a phase drift value, an amplitude variation value, a timing advance variation value, a length of time of uplink continuity, or any combination thereof.

In some examples, the capability message transmitter 745 may be configured as or otherwise support a means for transmitting a UE capability message to the base station, the UE capability message indicating a capability of the UE to maintain uplink continuity for uplink transmissions.

In some examples, the capability of the UE corresponds to an uplink continuity classification of a set of uplink continuity classifications associated with uplink continuity for the UE.

In some examples, to support communicating with the base station, the capability modification component 750 may be configured as or otherwise support a means for modifying the capability of the UE to maintain uplink continuity for uplink transmissions based on the feedback message from the base station. In some examples, to support communicating with the base station, the capability message transmitter 745 may be configured as or otherwise support a means for transmitting a UE capability message indicating the modified capability of the UE to maintain uplink continuity for uplink transmissions.

In some examples, to support receiving the feedback message, the feedback message receiver 755 may be configured as or otherwise support a means for receiving the feedback message via RRC signaling, a MAC-CE, DCI, or a combination thereof.

In some examples, the one or more uplink parameters includes a phase, an amplitude, a timing advance, or any combination thereof associated with the set of multiple uplink messages.

Figure 8:
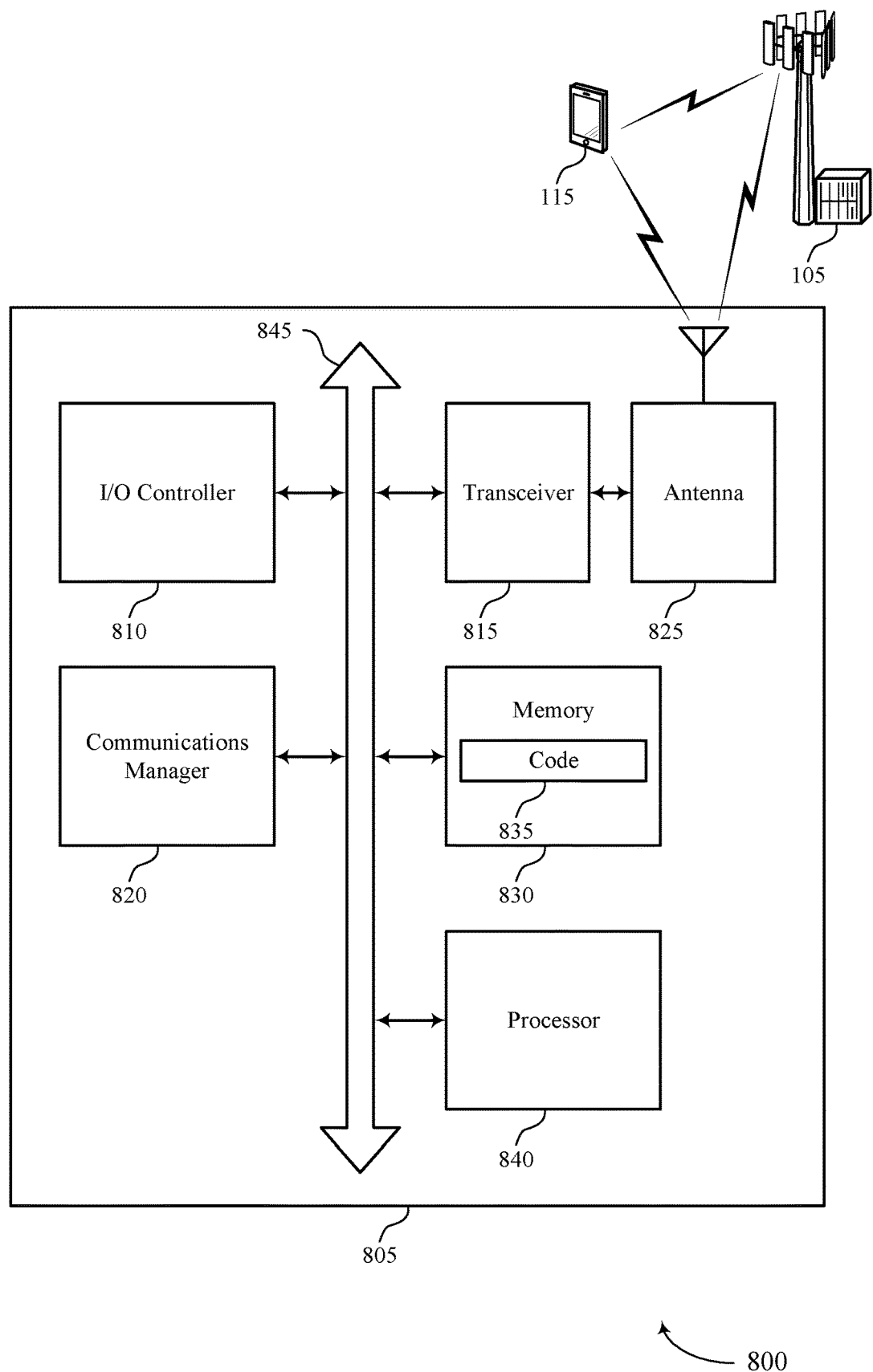
FIG. 8 shows a diagram of a system including a device that supports network feedback for uplink continuity in accordance with aspects of the present disclosure.

FIG. 8 shows a diagram of a system 800 including a device 805 that supports network feedback for uplink continuity in accordance with aspects of the present disclosure. The device 805 may be an example of or include the components of a device 505, a device 605, or a UE 115 as described herein. The device 805 may communicate wirelessly with one or more base stations 105, UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally, or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting network feedback for uplink continuity). For example, the device 805 or a component of the device 805 may include a processor 840 and memory 830 coupled to the processor 840, the processor 840 and memory 830 configured to perform various functions described herein.

The communications manager 820 may support wireless communications at a UE in accordance with examples as disclosed herein. For example, the communications manager 820 may be configured as or otherwise support a means for transmitting a set of multiple uplink messages to a base station over a set of TTIs. The communications manager 820 may be configured as or otherwise support a means for receiving, from the base station, a feedback message indicating a quality of uplink continuity of the UE based on the set of multiple uplink messages, where the uplink continuity corresponds to a variation of one or more uplink parameters associated with the set of multiple uplink messages over the set of TTIs. The communications manager 820 may be configured as or otherwise support a means for communicating with the base station based on the feedback message.

By including or configuring the communications manager 820 in accordance with examples as described herein, the device 805 may support techniques for reducing latency, reducing signaling overhead, and increasing network efficiency by reducing occurrences of inaccurate channel estimation. Specifically, a feedback message may correct mismatches between an indicated uplink continuity and observed uplink continuity. By deconflicting a quality of uplink continuity between two or more wireless devices, joint channel estimation may be performed, which may result in more efficient network operations, more efficient utilization of power and network resources, and reduced latency.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of network feedback for uplink continuity as described herein, or the processor 840 and the memory 830 may be otherwise configured to perform or support such operations.

Figure 9:
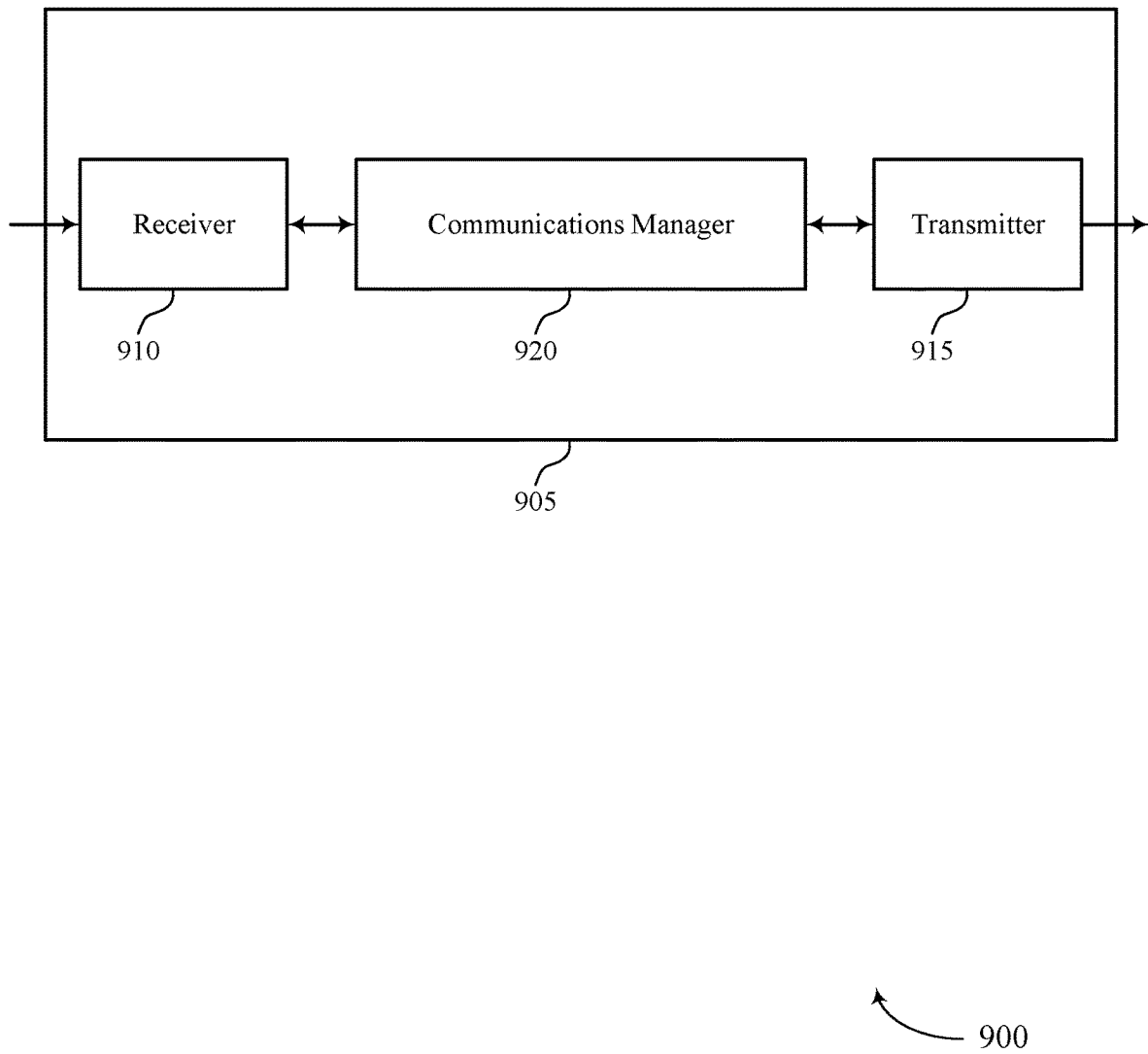
FIGS. 9 and 10 show block diagrams of devices that support network feedback for uplink continuity in accordance with aspects of the present disclosure.

FIG. 9 shows a block diagram 900 of a device 905 that supports network feedback for uplink continuity in accordance with aspects of the present disclosure. The device 905 may be an example of aspects of a base station 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to network feedback for uplink continuity). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to network feedback for uplink continuity). In some examples, the transmitter 915 may be co-located with a receiver 910 in a transceiver module. The transmitter 915 may utilize a single antenna or a set of multiple antennas.

The communications manager 920, the receiver 910, the transmitter 915, or various combinations thereof or various components thereof may be examples of means for performing various aspects of network feedback for uplink continuity as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 920 may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communications at a base station in accordance with examples as disclosed herein. For example, the communications manager 920 may be configured as or otherwise support a means for receiving, from a UE, a set of multiple uplink messages over a set of TTIs. The communications manager 920 may be configured as or otherwise support a means for transmitting, to the UE, a feedback message indicating a quality of uplink continuity of the UE based on the set of multiple uplink messages, where the uplink continuity corresponds to a variation of one or more uplink parameters associated with the set of multiple uplink messages over the set of TTIs. The communications manager 920 may be configured as or otherwise support a means for communicating with the UE based on the feedback message.

By including or configuring the communications manager 920 in accordance with examples as described herein, the device 905 (e.g., a processor controlling or otherwise coupled to the receiver 910, the transmitter 915, the communications manager 920, or a combination thereof) may support techniques for reduced processing and power consumption by reducing inaccurate channel estimation via network feedback of uplink continuity. Further, the described techniques support more efficient communications resource utilization and an overall reduction in signaling overhead by avoiding prolonged mismatches between indicated uplink continuity and observed uplink continuity, which may prevent additional signaling due to inaccurate channel estimation.

Figure 10:
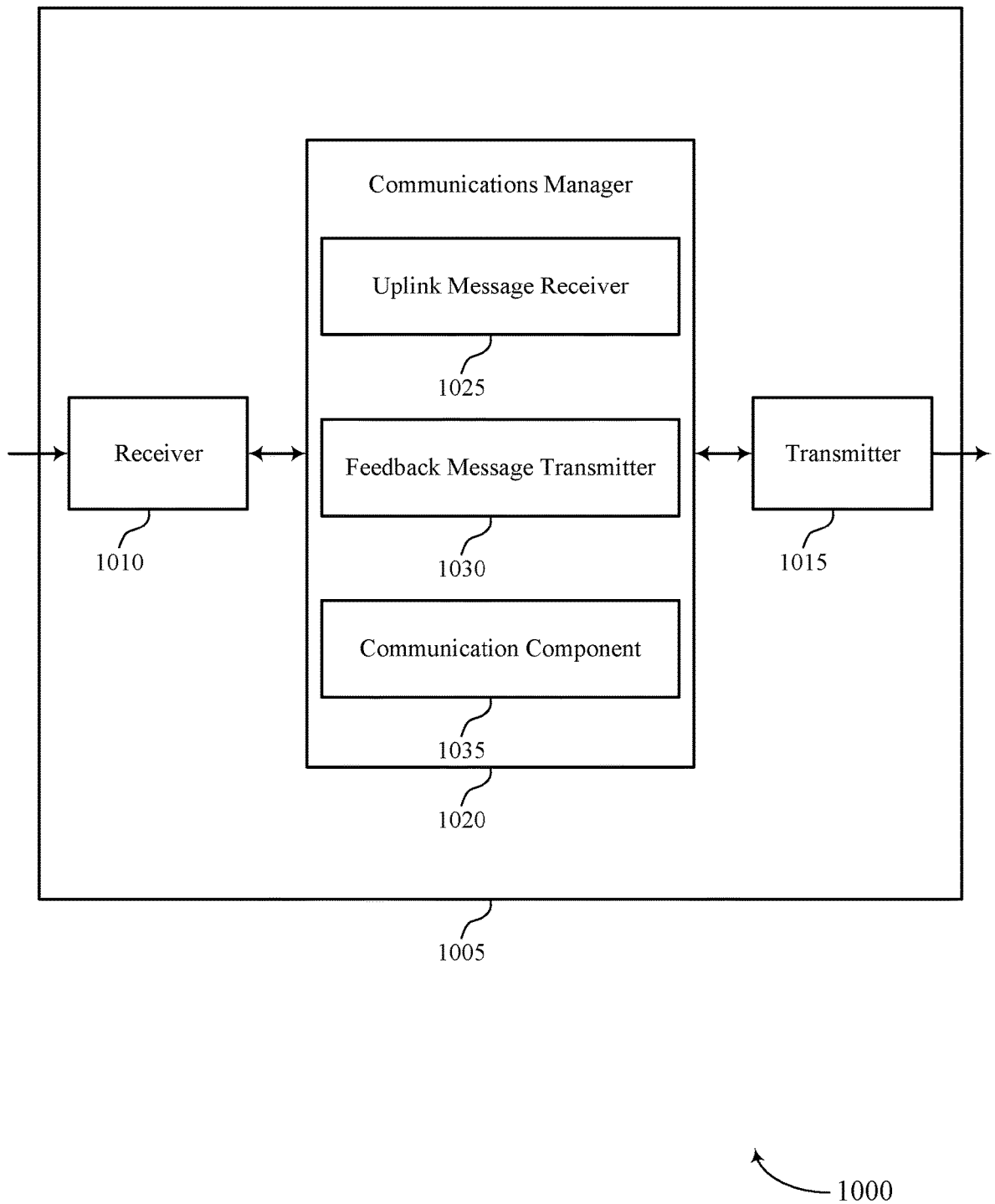

FIG. 10 shows a block diagram 1000 of a device 1005 that supports network feedback for uplink continuity in accordance with aspects of the present disclosure. The device 1005 may be an example of aspects of a device 905 or a base station 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to network feedback for uplink continuity). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to network feedback for uplink continuity). In some examples, the transmitter 1015 may be co-located with a receiver 1010 in a transceiver module. The transmitter 1015 may utilize a single antenna or a set of multiple antennas.

The device 1005, or various components thereof, may be an example of means for performing various aspects of network feedback for uplink continuity as described herein. For example, the communications manager 1020 may include an uplink message receiver 1025, a feedback message transmitter 1030, a communication component 1035, or any combination thereof. The communications manager 1020 may be an example of aspects of a communications manager 920 as described herein. In some examples, the communications manager 1020, or various components thereof, may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communications at a base station in accordance with examples as disclosed herein. The uplink message receiver 1025 may be configured as or otherwise support a means for receiving, from a UE, a set of multiple uplink messages over a set of TTIs. The feedback message transmitter 1030 may be configured as or otherwise support a means for transmitting, to the UE, a feedback message indicating a quality of uplink continuity of the UE based on the set of multiple uplink messages, where the uplink continuity corresponds to a variation of one or more uplink parameters associated with the set of multiple uplink messages over the set of TTIs. The communication component 1035 may be configured as or otherwise support a means for communicating with the UE based on the feedback message.

Figure 11:
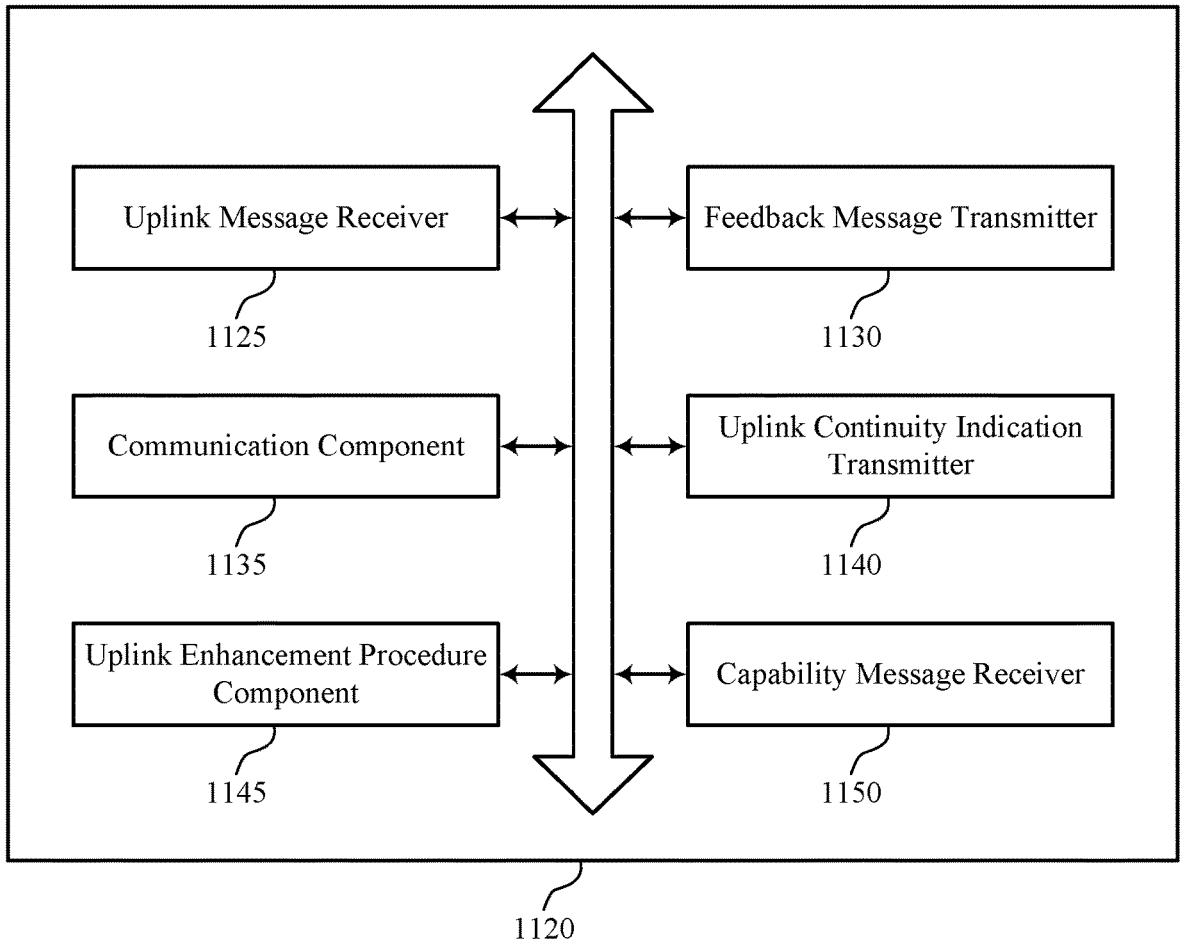
FIG. 11 shows a block diagram of a communications manager that supports network feedback for uplink continuity in accordance with aspects of the present disclosure.

FIG. 11 shows a block diagram 1100 of a communications manager 1120 that supports network feedback for uplink continuity in accordance with aspects of the present disclosure. The communications manager 1120 may be an example of aspects of a communications manager 920, a communications manager 1020, or both, as described herein. The communications manager 1120, or various components thereof, may be an example of means for performing various aspects of network feedback for uplink continuity as described herein. For example, the communications manager 1120 may include an uplink message receiver 1125, a feedback message transmitter 1130, a communication component 1135, an uplink continuity indication transmitter 1140, an uplink enhancement procedure component 1145, a capability message receiver 1150, or any combination thereof. Each of these components may communicate, directly or indirectly, with one another (e.g., via one or more buses).

The communications manager 1120 may support wireless communications at a base station in accordance with examples as disclosed herein. The uplink message receiver 1125 may be configured as or otherwise support a means for receiving, from a UE, a set of multiple uplink messages over a set of TTIs. The feedback message transmitter 1130 may be configured as or otherwise support a means for transmitting, to the UE, a feedback message indicating a quality of uplink continuity of the UE based on the set of multiple uplink messages, where the uplink continuity corresponds to a variation of one or more uplink parameters associated with the set of multiple uplink messages over the set of TTIs. The communication component 1135 may be configured as or otherwise support a means for communicating with the UE based on the feedback message.

In some examples, to support transmitting the feedback message, the uplink continuity indication transmitter 1140 may be configured as or otherwise support a means for transmitting an indication of a phase drift, an amplitude variation, a timing advance variation, or a combination thereof observed by the base station over the set of TTIs based on the set of multiple uplink messages.

In some examples, to support transmitting the feedback message, the uplink continuity indication transmitter 1140 may be configured as or otherwise support a means for transmitting an indication of a time length associated with uplink continuity of the UE observed by the base station over the set of TTIs based on the set of multiple uplink messages.

In some examples, to support transmitting the feedback message, the uplink continuity indication transmitter 1140 may be configured as or otherwise support a means for transmitting an indication of presence or absence of phase continuity, amplitude continuity, or both observed by the base station over the set of TTIs based on the set of multiple uplink messages.

In some examples, to support transmitting the feedback message, the uplink continuity indication transmitter 1140 may be configured as or otherwise support a means for transmitting downlink control information including a set of bits indicating a phase drift value, an amplitude variation value, a timing advance variation value, a length of time of uplink continuity, or any combination thereof.

In some examples, to support communicating with the UE, the uplink enhancement procedure component 1145 may be configured as or otherwise support a means for selecting an uplink enhancement procedure for communicating with the UE based on the quality of the uplink continuity of the UE.

In some examples, the uplink enhancement procedure includes bundling of reference signals across one or more uplink transmissions.

In some examples, the capability message receiver 1150 may be configured as or otherwise support a means for receiving a UE capability message from the UE, the UE capability message indicating a capability of the UE to maintain uplink continuity for uplink transmissions.

In some examples, the capability of the UE corresponds to an uplink continuity classification of a set of uplink continuity classifications associated with uplink continuity for the UE.

In some examples, the uplink continuity indication transmitter 1140 may be configured as or otherwise support a means for transmitting an indication of a second uplink continuity classification of the set of uplink continuity classifications based on the feedback message, where the second uplink continuity classification is different from the uplink continuity classification.

In some examples, the capability message receiver 1150 may be configured as or otherwise support a means for receiving a second UE capability message indicating a modified capability of the UE to maintain uplink continuity for uplink transmissions based on the feedback message, the modified capability of the UE based on the variation.

In some examples, to support transmitting the feedback message, the feedback message transmitter 1130 may be configured as or otherwise support a means for transmitting the feedback message via RRC signaling, a MAC-CE, DCI, or a combination thereof.

In some examples, the one or more uplink parameters includes a phase, an amplitude, a timing advance, or any combination thereof associated with the set of multiple uplink messages.

Figure 12:
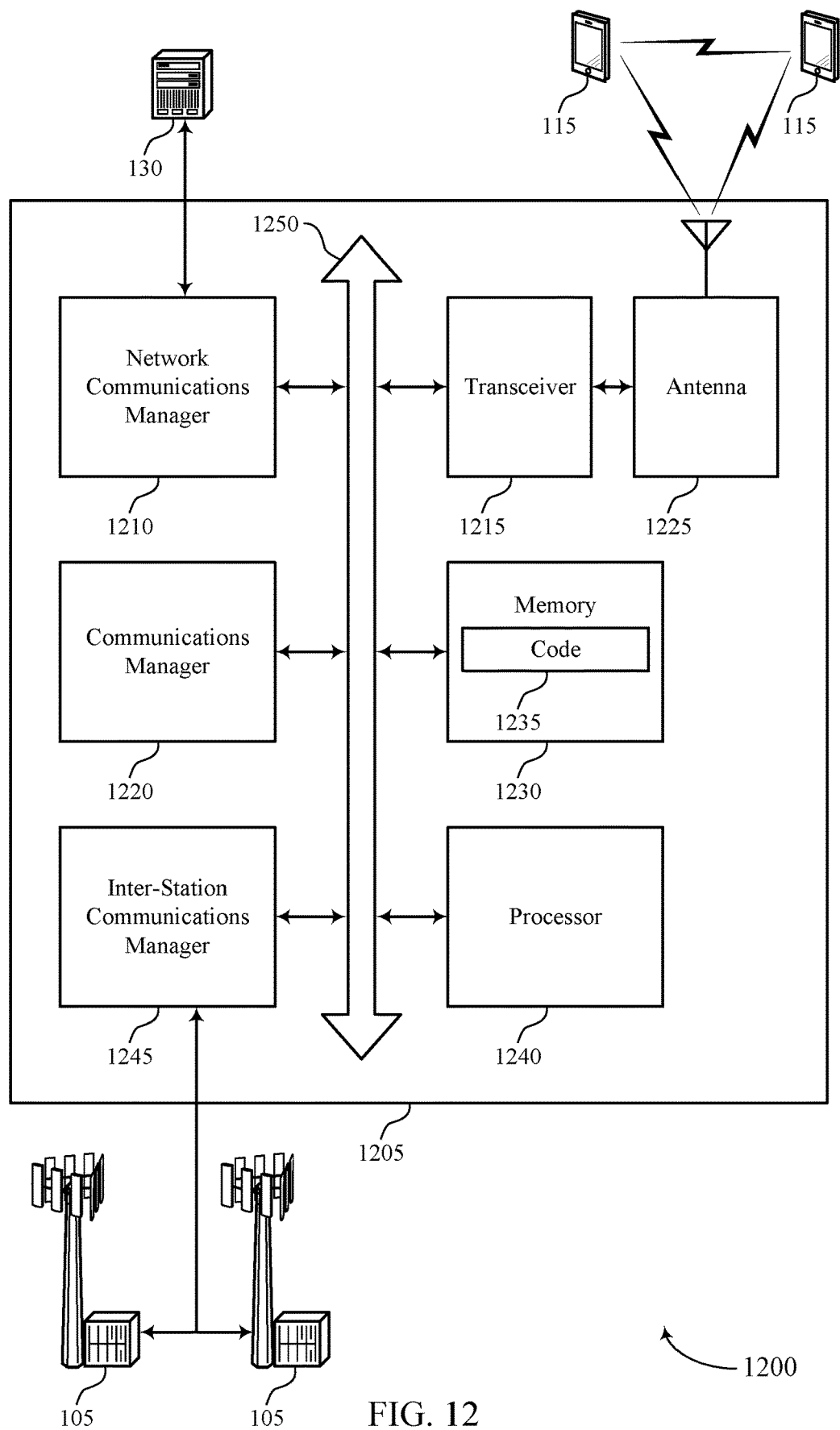
FIG. 12 shows a diagram of a system including a device that supports network feedback for uplink continuity in accordance with aspects of the present disclosure.

FIG. 12 shows a diagram of a system 1200 including a device 1205 that supports network feedback for uplink continuity in accordance with aspects of the present disclosure. The device 1205 may be an example of or include the components of a device 905, a device 1005, or a base station 105 as described herein. The device 1205 may communicate wirelessly with one or more base stations 105, UEs 115, or any combination thereof. The device 1205 may include components for bi-directional voice and data communications including components for transmitting and receiving communications, such as a communications manager 1220, a network communications manager 1210, a transceiver 1215, an antenna 1225, a memory 1230, code 1235, a processor 1240, and an inter-station communications manager 1245. These components may be in electronic communication or otherwise coupled (e.g., operatively, communicatively, functionally, electronically, electrically) via one or more buses (e.g., a bus 1250).

The network communications manager 1210 may manage communications with a core network 130 (e.g., via one or more wired backhaul links). For example, the network communications manager 1210 may manage the transfer of data communications for client devices, such as one or more UEs 115.

In some cases, the device 1205 may include a single antenna 1225. However, in some other cases the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets, to provide the modulated packets to one or more antennas 1225 for transmission, and to demodulate packets received from the one or more antennas 1225. The transceiver 1215, or the transceiver 1215 and one or more antennas 1225, may be an example of a transmitter 915, a transmitter 1015, a receiver 910, a receiver 1010, or any combination thereof or component thereof, as described herein.

The memory 1230 may include RAM and ROM. The memory 1230 may store computer-readable, computer-executable code 1235 including instructions that, when executed by the processor 1240, cause the device 1205 to perform various functions described herein. The code 1235 may be stored in a non-transitory computer-readable medium such as system memory or another type of memory. In some cases, the code 1235 may not be directly executable by the processor 1240 but may cause a computer (e.g., when compiled and executed) to perform functions described herein. In some cases, the memory 1230 may contain, among other things, a BIOS which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting network feedback for uplink continuity). For example, the device 1205 or a component of the device 1205 may include a processor 1240 and memory 1230 coupled to the processor 1240, the processor 1240 and memory 1230 configured to perform various functions described herein.

The inter-station communications manager 1245 may manage communications with other base stations 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communications network technology to provide communication between base stations 105.

The communications manager 1220 may support wireless communications at a base station in accordance with examples as disclosed herein. For example, the communications manager 1220 may be configured as or otherwise support a means for receiving, from a UE, a set of multiple uplink messages over a set of TTIs. The communications manager 1220 may be configured as or otherwise support a means for transmitting, to the UE, a feedback message indicating a quality of uplink continuity of the UE based on the set of multiple uplink messages, where the uplink continuity corresponds to a variation of one or more uplink parameters associated with the set of multiple uplink messages over the set of TTIs. The communications manager 1220 may be configured as or otherwise support a means for communicating with the UE based on the feedback message.

By including or configuring the communications manager 1220 in accordance with examples as described herein, the device 1205 may support techniques for reducing latency, reducing signaling overhead, and increasing network efficiency by reducing occurrences of inaccurate channel estimation. Specifically, a feedback message may correct mismatches between an indicated uplink continuity and observed uplink continuity. By deconflicting a quality of uplink continuity between two or more wireless devices, joint channel estimation may be performed, which may result in more efficient network operations, more efficient utilization of power and network resources, and reduced latency.

In some examples, the communications manager 1220 may be configured to perform various operations (e.g., receiving, monitoring, transmitting) using or otherwise in cooperation with the transceiver 1215, the one or more antennas 1225, or any combination thereof. Although the communications manager 1220 is illustrated as a separate component, in some examples, one or more functions described with reference to the communications manager 1220 may be supported by or performed by the processor 1240, the memory 1230, the code 1235, or any combination thereof. For example, the code 1235 may include instructions executable by the processor 1240 to cause the device 1205 to perform various aspects of network feedback for uplink continuity as described herein, or the processor 1240 and the memory 1230 may be otherwise configured to perform or support such operations.

Figure 13:
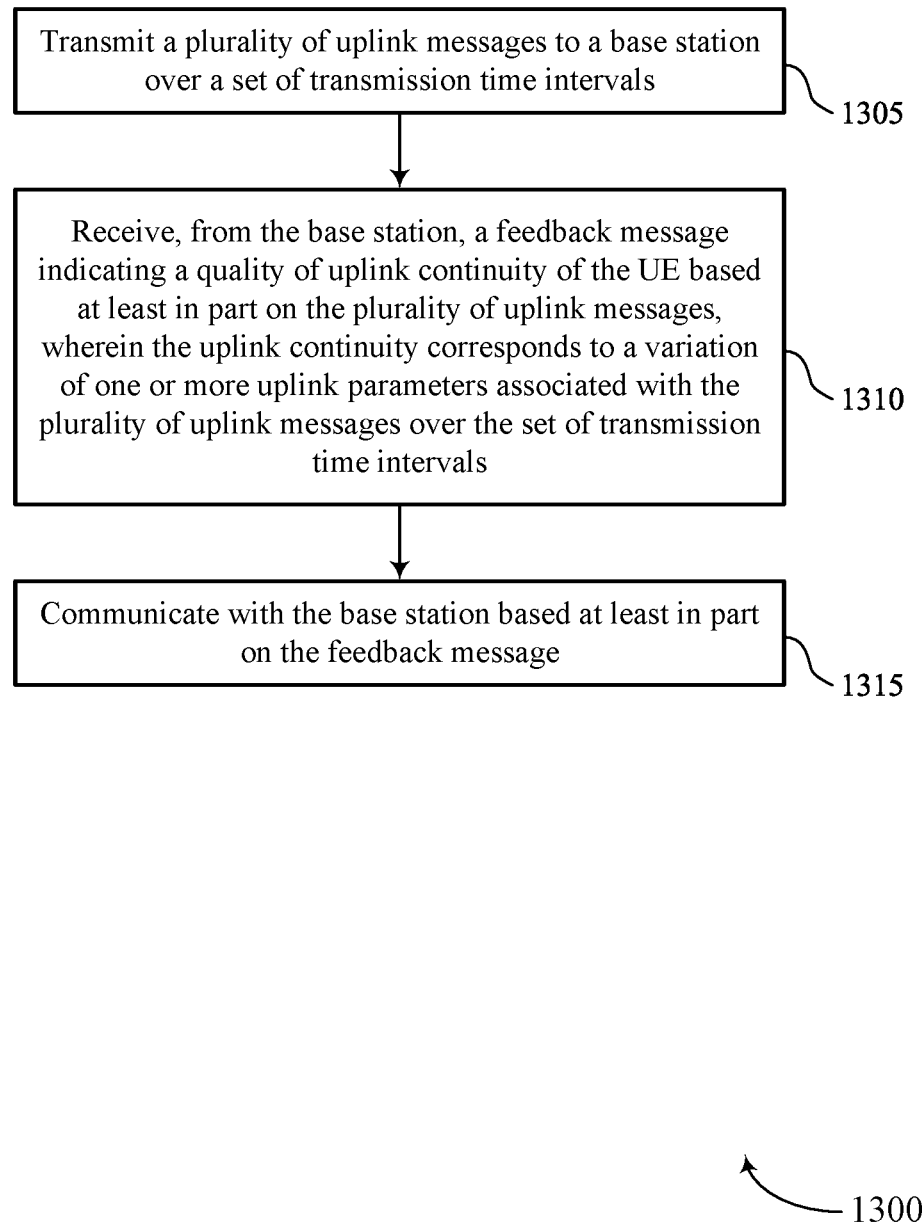
FIGS. 13 through 16 show flowcharts illustrating methods that support network feedback for uplink continuity in accordance with aspects of the present disclosure.

FIG. 13 shows a flowchart illustrating a method 1300 that supports network feedback for uplink continuity in accordance with aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1305, the method may include transmitting a set of multiple uplink messages to a base station over a set of TTIs. The operations of 1305 may be performed in accordance with examples as disclosed herein. In some examples, aspects of the operations of 1305 may be performed by an uplink message transmitter 725 as described with reference to FIG. 7.

At 1310, the method may include receiving, from the base station, a feedback message indicating a quality of uplink continuity of the UE based on the set of multiple uplink messages, where the uplink continuity corresponds to a variation of one or more uplink parameters associated with the set of multiple uplink messages over the set of TTIs. The operations of 1310 may be performed in accordance with examples as disclosed herein. In some examples, aspects of the operations of 1310 may be performed by a feedback message receiver 730 as described with reference to FIG. 7.

At 1315, the method may include communicating with the base station based on the feedback message. The operations of 1315 may be performed in accordance with examples as disclosed herein. In some examples, aspects of the operations of 1315 may be performed by a communication component 735 as described with reference to FIG. 7.

Figure 14:
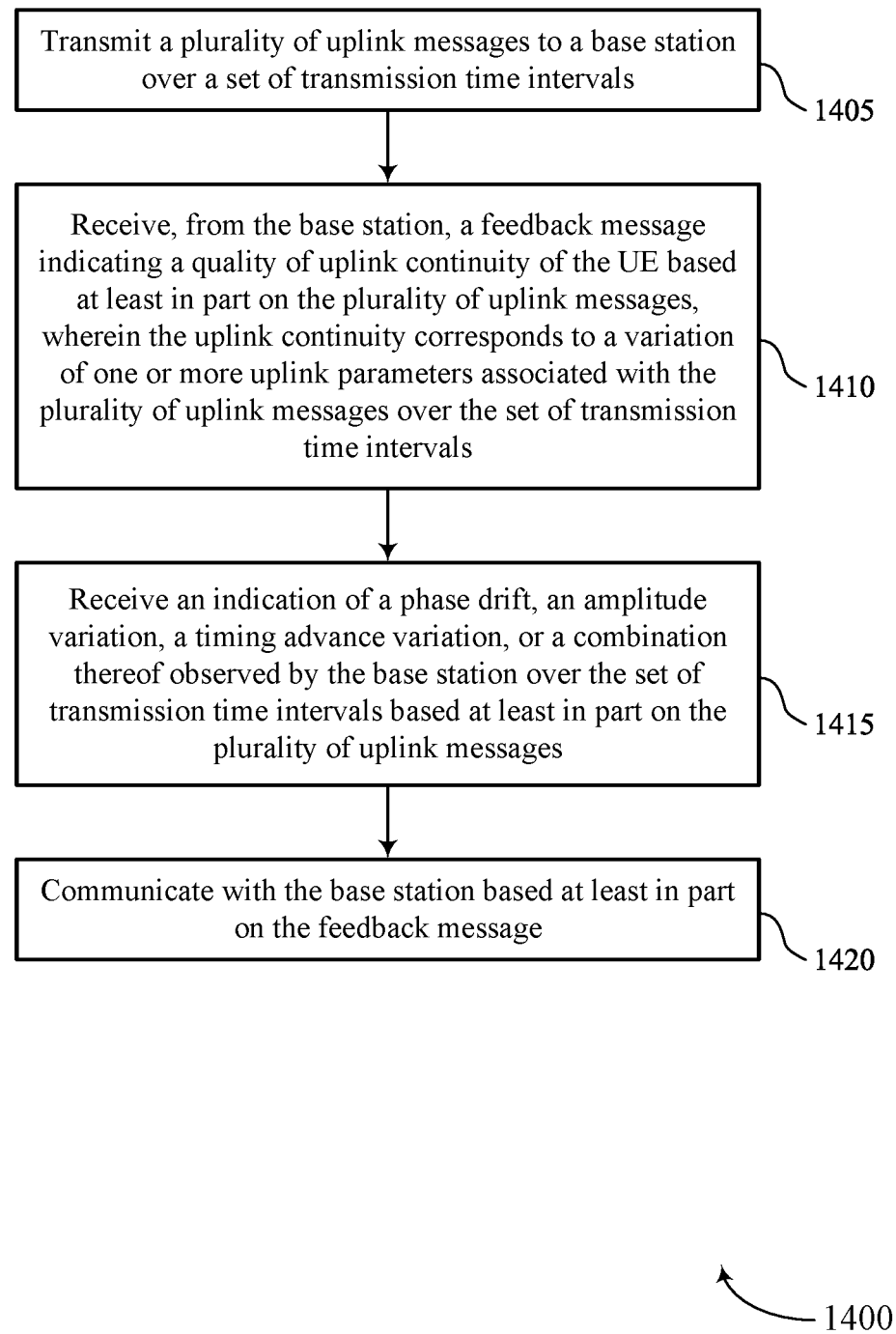

FIG. 14 shows a flowchart illustrating a method 1400 that supports network feedback for uplink continuity in accordance with aspects of the present disclosure. The operations of the method 1400 may be implemented by a UE or its components as described herein. For example, the operations of the method 1400 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1405, the method may include transmitting a set of multiple uplink messages to a base station over a set of TTIs. The operations of 1405 may be performed in accordance with examples as disclosed herein. In some examples, aspects of the operations of 1405 may be performed by an uplink message transmitter 725 as described with reference to FIG. 7.

At 1410, the method may include receiving, from the base station, a feedback message indicating a quality of uplink continuity of the UE based on the set of multiple uplink messages, where the uplink continuity corresponds to a variation of one or more uplink parameters associated with the set of multiple uplink messages over the set of TTIs. The operations of 1410 may be performed in accordance with examples as disclosed herein. In some examples, aspects of the operations of 1410 may be performed by a feedback message receiver 730 as described with reference to FIG. 7.

At 1415, the method may include receiving an indication of a phase drift, an amplitude variation, a timing advance variation, or a combination thereof observed by the base station over the set of TTIs based on the set of multiple uplink messages. The operations of 1415 may be performed in accordance with examples as disclosed herein. In some examples, aspects of the operations of 1415 may be performed by an uplink continuity indication component 740 as described with reference to FIG. 7.

At 1420, the method may include communicating with the base station based on the feedback message. The operations of 1420 may be performed in accordance with examples as disclosed herein. In some examples, aspects of the operations of 1420 may be performed by a communication component 735 as described with reference to FIG. 7.

Figure 15:
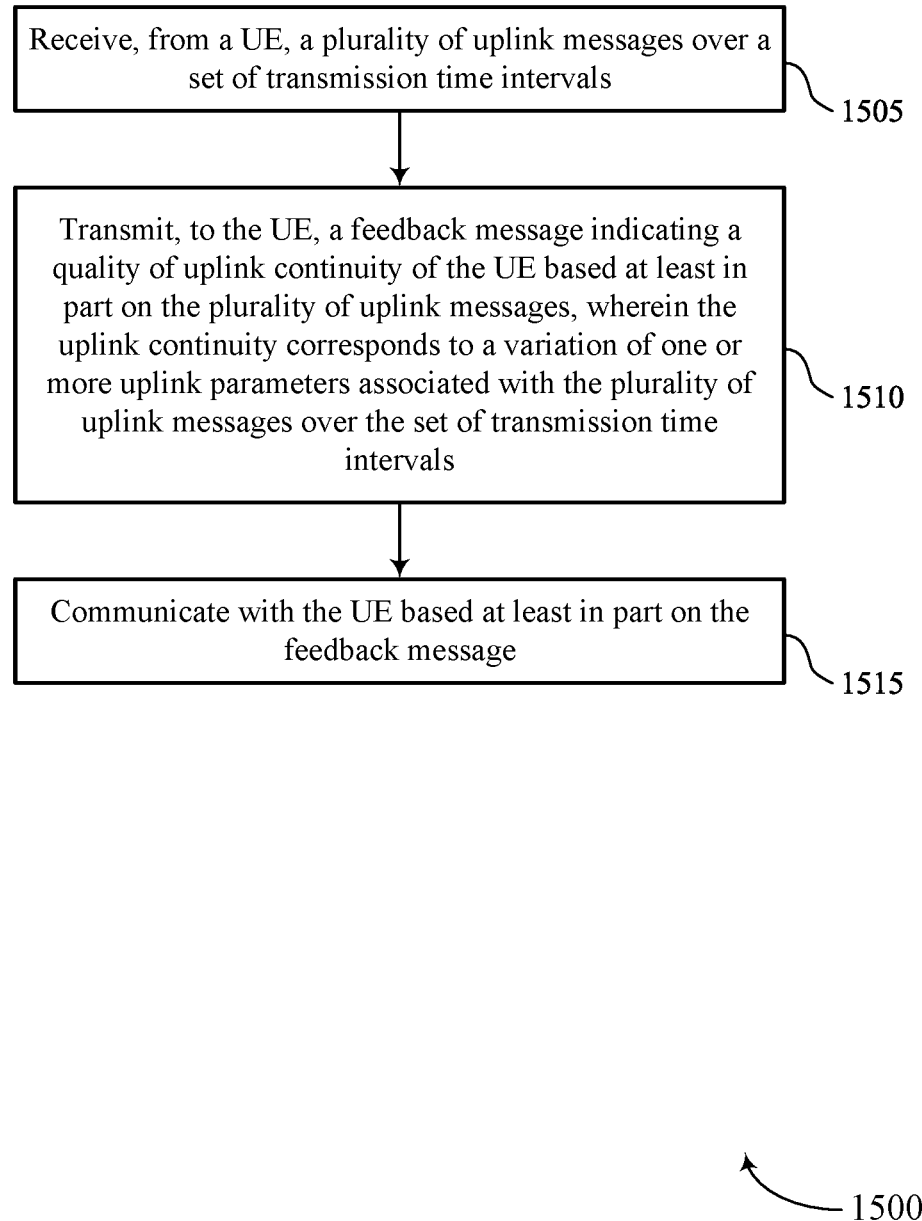

FIG. 15 shows a flowchart illustrating a method 1500 that supports network feedback for uplink continuity in accordance with aspects of the present disclosure. The operations of the method 1500 may be implemented by a base station or its components as described herein. For example, the operations of the method 1500 may be performed by a base station 105 as described with reference to FIGS. 1 through 4 and 9 through 12. In some examples, a base station may execute a set of instructions to control the functional elements of the base station to perform the described functions. Additionally, or alternatively, the base station may perform aspects of the described functions using special-purpose hardware.

At 1505, the method may include receiving, from a UE, a set of multiple uplink messages over a set of TTIs. The operations of 1505 may be performed in accordance with examples as disclosed herein. In some examples, aspects of the operations of 1505 may be performed by an uplink message receiver 1125 as described with reference to FIG. 11.

At 1510, the method may include transmitting, to the UE, a feedback message indicating a quality of uplink continuity of the UE based on the set of multiple uplink messages, where the uplink continuity corresponds to a variation of one or more uplink parameters associated with the set of multiple uplink messages over the set of TTIs. The operations of 1510 may be performed in accordance with examples as disclosed herein. In some examples, aspects of the operations of 1510 may be performed by a feedback message transmitter 1130 as described with reference to FIG. 11.

At 1515, the method may include communicating with the UE based on the feedback message. The operations of 1515 may be performed in accordance with examples as disclosed herein. In some examples, aspects of the operations of 1515 may be performed by a communication component 1135 as described with reference to FIG. 11.

Figure 16:
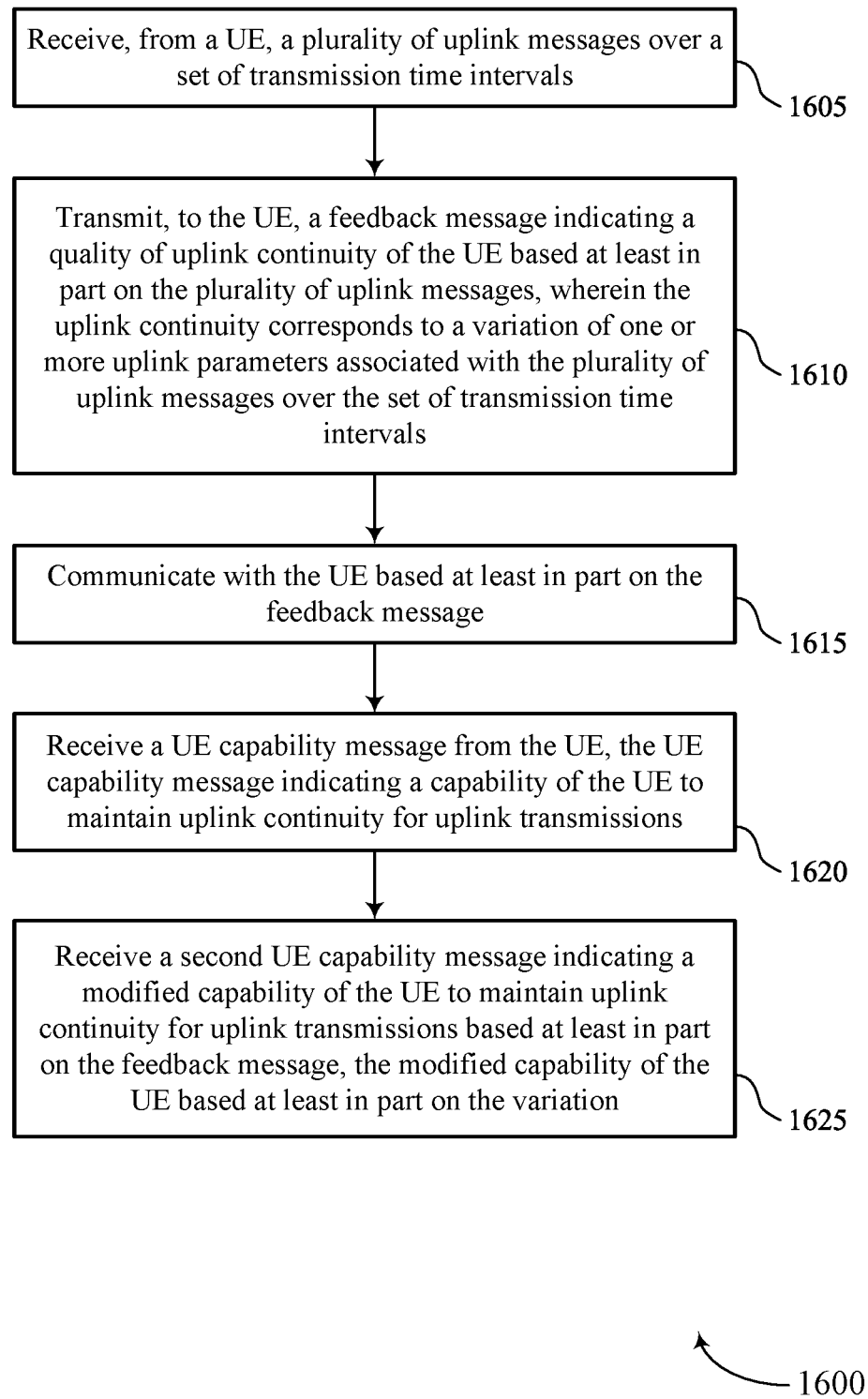

FIG. 16 shows a flowchart illustrating a method 1600 that supports network feedback for uplink continuity in accordance with aspects of the present disclosure. The operations of the method 1600 may be implemented by a base station or its components as described herein. For example, the operations of the method 1600 may be performed by a base station 105 as described with reference to FIGS. 1 through 4 and 9 through 12. In some examples, a base station may execute a set of instructions to control the functional elements of the base station to perform the described functions. Additionally, or alternatively, the base station may perform aspects of the described functions using special-purpose hardware.

At 1605, the method may include receiving, from a UE, a set of multiple uplink messages over a set of TTIs. The operations of 1605 may be performed in accordance with examples as disclosed herein. In some examples, aspects of the operations of 1605 may be performed by an uplink message receiver 1125 as described with reference to FIG. 11.

At 1610, the method may include transmitting, to the UE, a feedback message indicating a quality of uplink continuity of the UE based on the set of multiple uplink messages, where the uplink continuity corresponds to a variation of one or more uplink parameters associated with the set of multiple uplink messages over the set of TTIs. The operations of 1610 may be performed in accordance with examples as disclosed herein. In some examples, aspects of the operations of 1610 may be performed by a feedback message transmitter 1130 as described with reference to FIG. 11.

At 1615, the method may include communicating with the UE based on the feedback message. The operations of 1615 may be performed in accordance with examples as disclosed herein. In some examples, aspects of the operations of 1615 may be performed by a communication component 1135 as described with reference to FIG. 11.

At 1620, the method may include receiving a UE capability message from the UE, the UE capability message indicating a capability of the UE to maintain uplink continuity for uplink transmissions. The operations of 1620 may be performed in accordance with examples as disclosed herein. In some examples, aspects of the operations of 1620 may be performed by a capability message receiver 1150 as described with reference to FIG. 11.

At 1625, the method may include receiving a second UE capability message indicating a modified capability of the UE to maintain uplink continuity for uplink transmissions based on the feedback message, the modified capability of the UE based on the variation. The operations of 1625 may be performed in accordance with examples as disclosed herein. In some examples, aspects of the operations of 1625 may be performed by a capability message receiver 1150 as described with reference to FIG. 11.

The following provides an overview of aspects of the present disclosure:

Aspect 1: A method for wireless communications at a UE, comprising: transmitting a plurality of uplink messages to a base station over a set of transmission time intervals receiving, from the base station, a feedback message indicating a quality of uplink continuity of the UE based at least in part on the plurality of uplink messages, wherein the uplink continuity corresponds to a variation of one or more uplink parameters associated with the plurality of uplink messages over the set of transmission time intervals communicating with the base station based at least in part on the feedback message Aspect 2: The method of aspect 1, wherein receiving the feedback message comprises: receiving an indication of a phase drift, an amplitude variation, a timing advance variation, or a combination thereof observed by the base station over the set of transmission time intervals based at least in part on the plurality of uplink messages Aspect 3: The method of any of aspects 1 through 2, wherein receiving the feedback message comprises: receiving an indication of a time length associated with uplink continuity of the UE observed by the base station over the set of transmission time intervals based at least in part on the plurality of uplink messages Aspect 4: The method of any of aspects 1 through 3, wherein receiving the feedback message comprises: receiving an indication of presence or absence of phase continuity, amplitude continuity, or both observed by the base station over the set of transmission time intervals based at least in part on the plurality of uplink messages Aspect 5: The method of any of aspects 1 through 4, wherein receiving the feedback message comprises: receiving downlink control information comprising a set of bits indicating a phase drift value, an amplitude variation value, a timing advance variation value, a length of time of uplink continuity, or any combination thereof Aspect 6: The method of any of aspects 1 through 5, further comprising: transmitting a UE capability message to the base station, the UE capability message indicating a capability of the UE to maintain uplink continuity for uplink transmissions Aspect 7: The method of aspect 6, wherein the capability of the UE corresponds to an uplink continuity classification of a set of uplink continuity classifications associated with uplink continuity for the UE Aspect 8: The method of any of aspects 1 through 7, wherein communicating with the base station comprises: modifying the capability of the UE to maintain uplink continuity for uplink transmissions based at least in part on the feedback message from the base station; and transmitting a UE capability message indicating the modified capability of the UE to maintain uplink continuity for uplink transmissions Aspect 9: The method of any of aspects 1 through 8, wherein receiving the feedback message comprises: receiving the feedback message via RRC signaling, a MAC-CE, DCI, or a combination thereof.

Aspect 10: The method of any of aspects 1 through 9, wherein the one or more uplink parameters comprises a phase, an amplitude, a timing advance, or any combination thereof associated with the plurality of uplink messages Aspect 11: A method for wireless communications at a base station, comprising: receiving, from a UE, a plurality of uplink messages over a set of transmission time intervals transmitting, to the UE, a feedback message indicating a quality of uplink continuity of the UE based at least in part on the plurality of uplink messages, wherein the uplink continuity corresponds to a variation of one or more uplink parameters associated with the plurality of uplink messages over the set of transmission time intervals communicating with the UE based at least in part on the feedback message Aspect 12: The method of aspect 11, wherein transmitting the feedback message comprises: transmitting an indication of a phase drift, an amplitude variation, a timing advance variation, or a combination thereof observed by the base station over the set of transmission time intervals based at least in part on the plurality of uplink messages Aspect 13: The method of any of aspects 11 through 12, wherein transmitting the feedback message comprises: transmitting an indication of a time length associated with uplink continuity of the UE observed by the base station over the set of transmission time intervals based at least in part on the plurality of uplink messages Aspect 14: The method of any of aspects 11 through 13, wherein transmitting the feedback message comprises: transmitting an indication of presence or absence of phase continuity, amplitude continuity, or both observed by the base station over the set of transmission time intervals based at least in part on the plurality of uplink messages Aspect 15: The method of any of aspects 11 through 14, wherein transmitting the feedback message comprises: transmitting downlink control information comprising a set of bits indicating a phase drift value, an amplitude variation value, a timing advance variation value, a length of time of uplink continuity, or any combination thereof Aspect 16: The method of any of aspects 11 through 15, wherein communicating with the UE comprises: selecting an uplink enhancement procedure for communicating with the UE based at least in part on the quality of the uplink continuity of the UE Aspect 17: The method of aspect 16, wherein the uplink enhancement procedure comprises bundling of reference signals across one or more uplink transmissions Aspect 18: The method of any of aspects 11 through 17, further comprising: receiving a UE capability message from the UE, the UE capability message indicating a capability of the UE to maintain uplink continuity for uplink transmissions Aspect 19: The method of aspect 18, wherein the capability of the UE corresponds to an uplink continuity classification of a set of uplink continuity classifications associated with uplink continuity for the UE Aspect 20: The method of aspect 19, further comprising: transmitting an indication of a second uplink continuity classification of the set of uplink continuity classifications based at least in part on the feedback message, wherein the second uplink continuity classification is different from the uplink continuity classification Aspect 21: The method of any of aspects 18 through 20, further comprising: receiving a second UE capability message indicating a modified capability of the UE to maintain uplink continuity for uplink transmissions based at least in part on the feedback message, the modified capability of the UE based at least in part on the variation Aspect 22: The method of any of aspects 11 through 21, wherein transmitting the feedback message comprises: transmitting the feedback message via RRC signaling, a MAC-CE, DCI, or a combination thereof.

Aspect 23: The method of any of aspects 11 through 22, wherein the one or more uplink parameters comprises a phase, an amplitude, a timing advance, or any combination thereof associated with the plurality of uplink messages Aspect 24: An apparatus for wireless communications at a UE, comprising a processor; memory coupled with the processor; and instructions stored in the memory and executable by the processor to cause the apparatus to perform a method of any of aspects 1 through 10.

Aspect 25: An apparatus for wireless communications at a UE, comprising at least one means for performing a method of any of aspects 1 through 10.

Aspect 26: A non-transitory computer-readable medium storing code for wireless communications at a UE, the code comprising instructions executable by a processor to perform a method of any of aspects 1 through 10.

Aspect 27: An apparatus for wireless communications at a base station, comprising a processor; memory coupled with the processor; and instructions stored in the memory and executable by the processor to cause the apparatus to perform a method of any of aspects 11 through 23.

Aspect 28: An apparatus for wireless communications at a base station, comprising at least one means for performing a method of any of aspects 11 through 23.

Aspect 29: A non-transitory computer-readable medium storing code for wireless communications at a base station, the code comprising instructions executable by a processor to perform a method of any of aspects 11 through 23.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a user equipment (UE), comprising:

transmitting a plurality of uplink messages to a network device via a set of transmission time intervals;
receiving, from the network device, a continuity feedback message indicating a quality of uplink continuity of the UE in response to the plurality of uplink messages, wherein the uplink continuity corresponds to a variation of one or more uplink parameters associated with the plurality of uplink messages via the set of transmission time intervals;
transmitting, to the network device, a UE capability message indicating a capability of the UE to maintain the uplink continuity for uplink transmissions, wherein the capability of the UE corresponds to an uplink continuity classification of a set of uplink continuity classifications associated with the uplink continuity for the UE; and
communicating with the network device based at least in part on the continuity feedback message.

2. The method of claim 1, wherein receiving the continuity feedback message comprises:
receiving an indication of a phase drift, an amplitude variation, a timing advance variation, or a combination thereof observed by the network device via the set of transmission time intervals based at least in part on the plurality of uplink messages.

3. The method of claim 1, wherein receiving the continuity feedback message comprises:
receiving an indication of a time length associated with the uplink continuity of the UE observed by the network device via the set of transmission time intervals based at least in part on the plurality of uplink messages.

4. The method of claim 1, wherein receiving the continuity feedback message comprises:
receiving an indication of presence or absence of phase continuity, amplitude continuity, or both observed by the network device via the set of transmission time intervals based at least in part on the plurality of uplink messages.

5. The method of claim 1, wherein receiving the continuity feedback message comprises:
receiving downlink control information comprising a set of bits indicating a phase drift value, an amplitude variation value, a timing advance variation value, a length of time of the uplink continuity, or any combination thereof.

6. The method of claim 1, wherein communicating with the network device comprises:
modifying the capability of the UE to maintain the uplink continuity for the uplink transmissions based at least in part on the continuity feedback message from the network device; and
transmitting a second UE capability message indicating the modified capability of the UE to maintain the uplink continuity for the uplink transmissions.

7. The method of claim 1, wherein receiving the continuity feedback message comprises:
receiving the continuity feedback message via radio resource control (RRC) signaling, a medium access control (MAC) control element (MAC-CE), downlink control information (DCI), or a combination thereof.

8. The method of claim 1, wherein the one or more uplink parameters comprises a phase, an amplitude, a timing advance, or any combination thereof associated with the plurality of uplink messages.

9. A method for wireless communications at a network device, comprising:
receiving, from a user equipment (UE), a plurality of uplink messages via a set of transmission time intervals;
transmitting, to the UE, a continuity feedback message indicating a quality of uplink continuity of the UE in response to the plurality of uplink messages, wherein the uplink continuity corresponds to a variation of one or more uplink parameters associated with the plurality of uplink messages via the set of transmission time intervals; and
communicating with the UE based at least in part on the continuity feedback message, wherein communicating with the UE comprises selecting an uplink enhancement procedure for communicating with the UE based at least in part on the quality of the uplink continuity of the UE.

10. The method of claim 9, wherein transmitting the continuity feedback message comprises:
transmitting an indication of a phase drift, an amplitude variation, a timing advance variation, or a combination thereof observed by the network device via the set of transmission time intervals based at least in part on the plurality of uplink messages.

11. The method of claim 9, wherein transmitting the continuity feedback message comprises:
transmitting an indication of a time length associated with the uplink continuity of the UE observed by the network device via the set of transmission time intervals based at least in part on the plurality of uplink messages.

12. The method of claim 9, wherein transmitting the continuity feedback message comprises:
transmitting an indication of presence or absence of phase continuity, amplitude continuity, or both observed by the network device via the set of transmission time intervals based at least in part on the plurality of uplink messages.

13. The method of claim 9, wherein transmitting the continuity feedback message comprises:
transmitting downlink control information comprising a set of bits indicating a phase drift value, an amplitude variation value, a timing advance variation value, a length of time of the uplink continuity, or any combination thereof.

14. The method of claim 9, wherein the uplink enhancement procedure comprises bundling of reference signals across one or more uplink transmissions.

15. The method of claim 9, further comprising:
receiving a UE capability message from the UE, the UE capability message indicating a capability of the UE to maintain the uplink continuity for uplink transmissions.

16. The method of claim 15, wherein the capability of the UE corresponds to an uplink continuity classification of a set of uplink continuity classifications associated with the uplink continuity for the UE.

17. The method of claim 16, further comprising:
transmitting an indication of a second uplink continuity classification of the set of uplink continuity classifications based at least in part on the continuity feedback message, wherein the second uplink continuity classification is different from the uplink continuity classification.

18. The method of claim 15, further comprising:
receiving a second UE capability message indicating a modified capability of the UE to maintain the uplink continuity for the uplink transmissions based at least in part on the continuity feedback message, the modified capability of the UE based at least in part on the observed variation.

19. The method of claim 9, wherein transmitting the continuity feedback message comprises:
transmitting the continuity feedback message via radio resource control (RRC) signaling, a medium access control (MAC) control element (MAC-CE), downlink control information (DCI), or a combination thereof.

20. The method of claim 9, wherein the one or more uplink parameters comprises a phase, an amplitude, a timing advance, or any combination thereof associated with the plurality of uplink messages.

21. An apparatus for wireless communications at a user equipment (UE), comprising:
a processor;
memory coupled with the processor; and
instructions stored in the memory and executable by the processor to cause the apparatus to:
transmit a plurality of uplink messages to a network device via a set of transmission time intervals;
receive, from the network device, a continuity feedback message indicating a quality of uplink continuity of the UE in response to the plurality of uplink messages, wherein the uplink continuity corresponds to a variation of one or more uplink parameters associated with the plurality of uplink messages via the set of transmission time intervals;
transmit, to the network device, a UE capability message indicating a capability of the UE to maintain the uplink continuity for uplink transmissions, wherein the capability of the UE corresponds to an uplink continuity classification of a set of uplink continuity classifications associated with the uplink continuity for the UE; and
communicate with the network device based at least in part on the continuity feedback message.

22. The apparatus of claim 21, wherein the instructions to receive the continuity feedback message are executable by the processor to cause the apparatus to:
receive an indication of a phase drift, an amplitude variation, a timing advance variation, or a combination thereof observed by the network device via the set of transmission time intervals based at least in part on the plurality of uplink messages.

23. The apparatus of claim 21, wherein the instructions to receive the continuity feedback message are executable by the processor to cause the apparatus to:
receive an indication of a time length associated with the uplink continuity of the UE observed by the network device via the set of transmission time intervals based at least in part on the plurality of uplink messages.

24. The apparatus of claim 21, wherein the instructions to receive the continuity feedback message are executable by the processor to cause the apparatus to:
receive an indication of presence or absence of phase continuity, amplitude continuity, or both observed by the network device via the set of transmission time intervals based at least in part on the plurality of uplink messages.

25. The apparatus of claim 21, wherein the instructions to receive the continuity feedback message are executable by the processor to cause the apparatus to:
receive downlink control information comprising a set of bits indicating a phase drift value, an amplitude variation value, a timing advance variation value, a length of time of the uplink continuity, or any combination thereof.

26. The apparatus of claim 21, wherein the instructions to communicate with the network device are executable by the processor to cause the apparatus to:
modify the capability of the UE to maintain the uplink continuity for the uplink transmissions based at least in part on the continuity feedback message from the network device; and
transmit a second UE capability message indicating the modified capability of the UE to maintain the uplink continuity for the uplink transmissions.

27. The apparatus of claim 21, wherein the instructions to receive the continuity feedback message are executable by the processor to cause the apparatus to:
receive the continuity feedback message via radio resource control (RRC) signaling, a medium access control (MAC) control element (MAC-CE), downlink control information (DCI), or a combination thereof.

28. The apparatus of claim 21, wherein the one or more uplink parameters comprises a phase, an amplitude, a timing advance, or any combination thereof associated with the plurality of uplink messages.

29. An apparatus for wireless communications at a network device, comprising:
a processor;
memory coupled with the processor; and
instructions stored in the memory and executable by the processor to cause the apparatus to:
receive, from a user equipment (UE), a plurality of uplink messages via a set of transmission time intervals;
transmit, to the UE, a continuity feedback message indicating a quality of uplink continuity of the UE in response to the plurality of uplink messages, wherein the uplink continuity corresponds to a variation of one or more uplink parameters associated with the plurality of uplink messages via the set of transmission time intervals; and
communicate with the UE based at least in part on the continuity feedback message, wherein the instructions to communicate with the UE are executable by the processor to cause the apparatus to select an uplink enhancement procedure for communicating with the UE based at least in part on the quality of the uplink continuity of the UE.

30. The apparatus of claim 29, wherein the instructions to transmit the continuity feedback message are executable by the processor to cause the apparatus to:
transmit an indication of a phase drift, an amplitude variation, a timing advance variation, or a combination thereof observed by the network device via the set of transmission time intervals based at least in part on the plurality of uplink messages.

31. The apparatus of claim 29, wherein the instructions to transmit the continuity feedback message are executable by the processor to cause the apparatus to:
transmit an indication of a time length associated with the uplink continuity of the UE observed by the network device via the set of transmission time intervals based at least in part on the plurality of uplink messages.

32. The apparatus of claim 29, wherein the instructions to transmit the continuity feedback message are executable by the processor to cause the apparatus to:
transmit an indication of presence or absence of phase continuity, amplitude continuity, or both observed by the network device via the set of transmission time intervals based at least in part on the plurality of uplink messages.

33. The apparatus of claim 29, wherein the instructions to transmit the continuity feedback message are executable by the processor to cause the apparatus to:
transmit downlink control information comprising a set of bits indicating a phase drift value, an amplitude variation value, a timing advance variation value, a length of time of the uplink continuity, or any combination thereof.

34. The apparatus of claim 29, wherein:
the uplink enhancement procedure comprises bundling of reference signals across one or more uplink transmissions.

35. The apparatus of claim 29, wherein the instructions are further executable by the processor to cause the apparatus to:
receive a UE capability message from the UE, the UE capability message indicating a capability of the UE to maintain the uplink continuity for uplink transmissions.

36. The apparatus of claim 35, wherein the capability of the UE corresponds to an uplink continuity classification of a set of uplink continuity classifications associated with the uplink continuity for the UE.

37. The apparatus of claim 36, wherein the instructions are further executable by the processor to cause the apparatus to:
transmit an indication of a second uplink continuity classification of the set of uplink continuity classifications based at least in part on the continuity feedback message, wherein the second uplink continuity classification is different from the uplink continuity classification.

38. The apparatus of claim 35, wherein the instructions are further executable by the processor to cause the apparatus to:
receive a second UE capability message indicating a modified capability of the UE to maintain the uplink continuity for the uplink transmissions based at least in part on the continuity feedback message, the modified capability of the UE based at least in part on the observed variation.

39. The apparatus of claim 29, wherein the instructions to transmit the continuity feedback message are executable by the processor to cause the apparatus to:
transmit the continuity feedback message via radio resource control (RRC) signaling, a medium access control (MAC) control element (MAC-CE), downlink control information (DCI), or a combination thereof.

40. The apparatus of claim 29, wherein the one or more uplink parameters comprises a phase, an amplitude, a timing advance, or any combination thereof associated with the plurality of uplink messages.

* * * * *